(12) United States Patent
Wu et al.

(10) Patent No.: US 10,859,508 B2
(45) Date of Patent: Dec. 8, 2020

(54) DEVICES AND METHODS FOR EVALUATION OF DEFORMABLE IMAGE REGISTRATION (DIR) SYSTEMS

(71) Applicant: Board of Regents, The University of Texas System, Austin, TX (US)

(72) Inventors: Richard Wu, Sugar Land, TX (US); Jinzhong Yang, Houston, TX (US); Paul Wisdom, Houston, TX (US); Amy Liu, Sugar Land, TX (US); Ronald Zhu, Bellaire, TX (US); Steven J. Frank, Bellaire, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 16/425,070

(22) Filed: May 29, 2019

(65) Prior Publication Data
US 2019/0369030 A1   Dec. 5, 2019

Related U.S. Application Data

(60) Provisional application No. 62/677,440, filed on May 29, 2018.

(51) Int. Cl.
*G01N 21/00* (2006.01)
*G01N 21/90* (2006.01)
(Continued)

(52) U.S. Cl.
CPC ......... *G01N 21/9009* (2013.01); *G01N 21/01* (2013.01); *G01N 21/8851* (2013.01);
(Continued)

(58) Field of Classification Search
CPC ............... G01N 21/01; G01N 21/8851; G01N 21/9009; G06T 2207/10081;
(Continued)

(56) References Cited

U.S. PATENT DOCUMENTS

| 4,538,071 A | * | 8/1985 | Bardoux ................... G01T 1/00 250/252.1 |
| 6,904,125 B2 | | 6/2005 | Van Dyk et al. |

(Continued)

FOREIGN PATENT DOCUMENTS

| KR | 10-1521382 | 5/2015 |
| WO | WO 2016/138449 | 9/1916 |

(Continued)

OTHER PUBLICATIONS

Cheung et al., "An externally and internally deformable, programmable lung motion phantom," *Medical Physics*, 42(5):2585-2593, 2015.
(Continued)

*Primary Examiner* — Peter B Kim
(74) *Attorney, Agent, or Firm* — Parker Highlander PLLC

(57) ABSTRACT

Apparatus and methods for evaluating the accuracy of deformable image registration (DIR) systems. Certain aspects may include a base and a support member coupled to the base, where the support member is configured to rotate about a first axis with respect to the base. Particular aspects may include a housing coupled to the support member, where the housing is configured to rotate about a second axis with respect to the support member. Specific aspects may include an insert coupled to the housing, where the insert is configured to rotate about a third axis with respect to the housing.

13 Claims, 12 Drawing Sheets

(51) Int. Cl.
G06T 7/33 (2017.01)
G01N 21/01 (2006.01)
G01N 21/88 (2006.01)

(52) U.S. Cl.
CPC .... G06T 7/337 (2017.01); *G06T 2207/10081* (2013.01); *G06T 2207/10088* (2013.01); *G06T 2207/10104* (2013.01); *G06T 2207/10108* (2013.01)

(58) Field of Classification Search
CPC . G06T 2207/10088; G06T 2207/10104; G06T 2207/10108; G06T 7/33; G06T 7/337; A61N 2005/1076; A61N 5/1042; A61N 5/1049; A61B 6/583
See application file for complete search history.

(56) References Cited

U.S. PATENT DOCUMENTS

| | | | |
|---|---|---|---|
| 7,667,191 | B2 | 2/2010 | Serban et al. |
| 8,039,790 | B2 | 10/2011 | Cho et al. |
| 8,812,077 | B2 | 8/2014 | Dempsey |
| 9,138,597 | B2 | 9/2015 | Weersink et al. |
| 9,435,895 | B2 | 9/2016 | Ruschin et al. |
| 2010/0254897 | A1 | 10/2010 | Frank et al. |
| 2012/0150505 | A1 | 6/2012 | Couch et al. |
| 2014/0294140 | A1 | 10/2014 | Kirby et al. |
| 2014/0303491 | A1 | 10/2014 | Shekhar et al. |
| 2015/0150466 | A1 | 6/2015 | Abi-Jaoudeh et al. |
| 2015/0245771 | A1 | 9/2015 | Wang et al. |
| 2016/0051219 | A1 | 2/2016 | Shimada et al. |
| 2016/0089106 | A1 | 3/2016 | Kirby et al. |
| 2017/0076449 | A1 | 3/2017 | Chow et al. |
| 2017/0122915 | A1 | 5/2017 | Vogt et al. |
| 2017/0186195 | A1 | 6/2017 | Lin et al. |
| 2017/0238897 | A1 | 8/2017 | Siewerdsen et al. |

FOREIGN PATENT DOCUMENTS

| | | |
|---|---|---|
| WO | WO 2016/142166 | 9/1916 |
| WO | WO 2008/139167 | 11/2008 |
| WO | WO 2014/022480 | 2/2014 |

OTHER PUBLICATIONS

Kirby et al., "A two-dimensional deformable phantom for quantitatively verifying deformation algorithms," *Medical Physics*, 38(8):4583-4586, 2011.
Modus Medical Devices Inc., "IMRT QA—multi-purpose body," 2018.
Soultanidis et al., "Demonstration of motion correction for PET-MR with PVA cryogel phantoms," *IEEE Nuclear Science Symposium and Medical Imaging Conference*, 2013.
Yeo et al., "A novel methodology for 3D deformable dosimetry," *Medical Physics*, 39(4):2203-2213, 2012.
Bender et al., "The utilization of consistency metrics for error analysis in deformable image registration," *Phys Med Biol*, 54(18):5561-5577, 2009.
Brock et al., "Feasibility of a novel deformable image registration technique to facilitate classification, targeting, and monitoring of tumor and normal tissue," *Int J Radiat Oncol Biol Phys*, 64(4):1245-1254, 2006.
Brock et al., "Use of image registration and fusion algorithms and techniques in radiotherapy: Report of the AAPM Radiation Therapy Committee Task Group No. 132," *Med Phys*, 44(7):e43-e76, 2017.
Brock, "Results of a multi-institution deformable registration accuracy study (MIDRAS)," *Int J Radiat Oncol Biol Phys*, 76(2):583-596, 2010.
Cunninghma et al., "Development and evaluation of a novel MR-compatible pelvic end-to-end phantom," *J Appl Clin Med Phys*, 2018.
Fallone et al., "Assessment of a commercially available automatic deformable registration system," *J Appl Clin Med Phys*, 11(3):101-123, 2010.
Followill et al., "Design, development, and implementation of the radiological physics center's pelvis and thorax anthropomorphic quality assurance phantoms," *Med Phys*, 34(6):2070-2076, 2007.
Fox et al., "Velocity and deformable image registration," *Varian Clinical Perspectives*, 2018.
García-Moná et al., "Validation of a Deformable Image Registration Produced by a Commercial Treatment Planning System in Head and Neck," *Physica Medica*, 31:219-223, 2015.
Ger et al., "Accuracy of Deformable Image Registration on Magnetic Resonance Images in Digital and Physical Phantoms," *Med Phys*, 44(10):5153-5161, 2017.
Graves et al., "A deformable head and neck phantom with in-vivo dosimetry for adaptive radiotherapy quality assurance," *Medical Physics*, 42(4):1490-1497, 2015.
Jamema et al., "Commissioning and Validation of Commercial Deformable Image Registration Software for Adaptive Contouring," *Physica Medica*, 47:1-8, 2018.
Juang et al., "On the Need for Comprehensive Validation of Deformable Image Registration, Investigated With a Novel 3-dimensional Deformable Dosimeter," *Int J Radiation Oncol Biol Phys*, 87(2):414-421, 2013.
Kadoya et al., "Evaluation of various deformable image registration algorithms for thoracic images," *J Radiat Res*, 55(1):175-182, 2014.
Kanai et al., "Evaluation of accuracy of B-spline transformation-based deformable image registration with different parameter settings for thoracic images," *J Radiat Res*, 55(6):1163-1170, 2014.
Kashani et al., "Objective assessment of deformable image registration in radiotherapy: a multi-institution study," *Med Phys*, 35(12):5944-5953, 2008.
Kashani et al., "Technical note: a physical phantom for assessment of accuracy of deformable alignment algorithms," *Med. Phys.*, 34(7):2785-2788, 2007.
Kirby et al., "The need for application-based adaptation of deformable image registration.," *Med Phys*, 40(1):011702, 2013.
Mohamed et al., "Quality assurance assessment of diagnostic and radiation therapy-simulation CT image registration for head and neck radiation therapy: anatomic region of interest-based comparison of rigid and deformable algorithms," *Radiology*, 274(3):752-763, 2015.
Molineu et al., "Design and implementation of an anthropomorphic quality assurance phantom for intensity-modulated radiation therapy for the Radiation Therapy Oncology Group," *Int J Radiat Oncol Biol Phys*, 63(2):577-583, 2005.
Pukala et al., "A virtual phantom library for the quantification of deformable image registration uncertainties in patients with cancers of the head and neck," *Med Phys*, 40(11):111703, 2013.
Reaungamornrat et al., "Performance evaluation of MIND demons deformable registration of MR and CT images in spinal interventions," *Phys Med Biol*, 61(23):8276-8297, 2016.
Saenz et al., "The Level of Detail Required in a Deformable Phantom to Accurately Perform Quality Assurance of Deformable Image Registration," *Phys. Med. Biol.*, 61:6269-6280, 2016.
Schreibmann et al., "A measure to evaluate deformable registration fields in clinical settings," *J Appl Clin Med Phys*, 13(5):126-139, 2012.
Singhrao et al., "A three-dimensional head-and-neck phantom for validation of multimodality deformable image registration for adaptive radiotherapy," *Med Phys*, 41(12):121709, 2014.
Stanley et al., "Using patient-specific phantoms to evaluate deformable image registration algorithms for adaptive radiation therapy," *J Appl Clin Med Phys*, 14(6):177-194, 2013.
Steinmann, "Developing and Characterizing MR/CT-visible Materials Used in QA Phantoms for MRgRT Systems," *Med. Phys.*, 45(2):773-782, 2018.
Tait et al., "The Use of MRI Deformable Image Registration for CT-based Brachytherapy in Locally Advanced Cervical Cancer," *Brachytherapy*, 15:333-340, 2016.
Takayama et al., "Evaluation of the Performance of Deformable Image Registration Between Planning CT and CBCT Images for the

(56) References Cited

OTHER PUBLICATIONS

Pelvic Region: Comparison Between Hybrid and Intensity-Based DIR," *Journal of Radiation Research*, 58(4):567-571, 2017.

Tyran et al., "Retrospective evaluation of decision-making for pancreatic stereotactic MR-guided adaptive radiotherapy," *Radiotherapy and Oncology*, 129:319-325, 2018.

Wognum et al., "Validation of deformable image registration algorithms on CT images of ex vivo porcine bladders with fiducial markers," *Med Phys*, 41(7):071916, 2014.

Wu et al., "Deformable image registration for the use of magnetic resonance spectroscopy in prostate treatment planning," *Int J Radiat Oncol Biol Phys*, 58(5):1577-1583, 2004.

Yan et al., "A model to accumulate fractionated dose in a deforming organ," *Int J Radiat Oncol Biol Phys*, 44(3):665-675, 1999.

Yu et al., "Learning anatomy changes from patient populations to create artificial CT images for voxel-level validation of deformable image registration," *J Appl Clin Med Phys*, 17(1):246-258, 2016.

\* cited by examiner

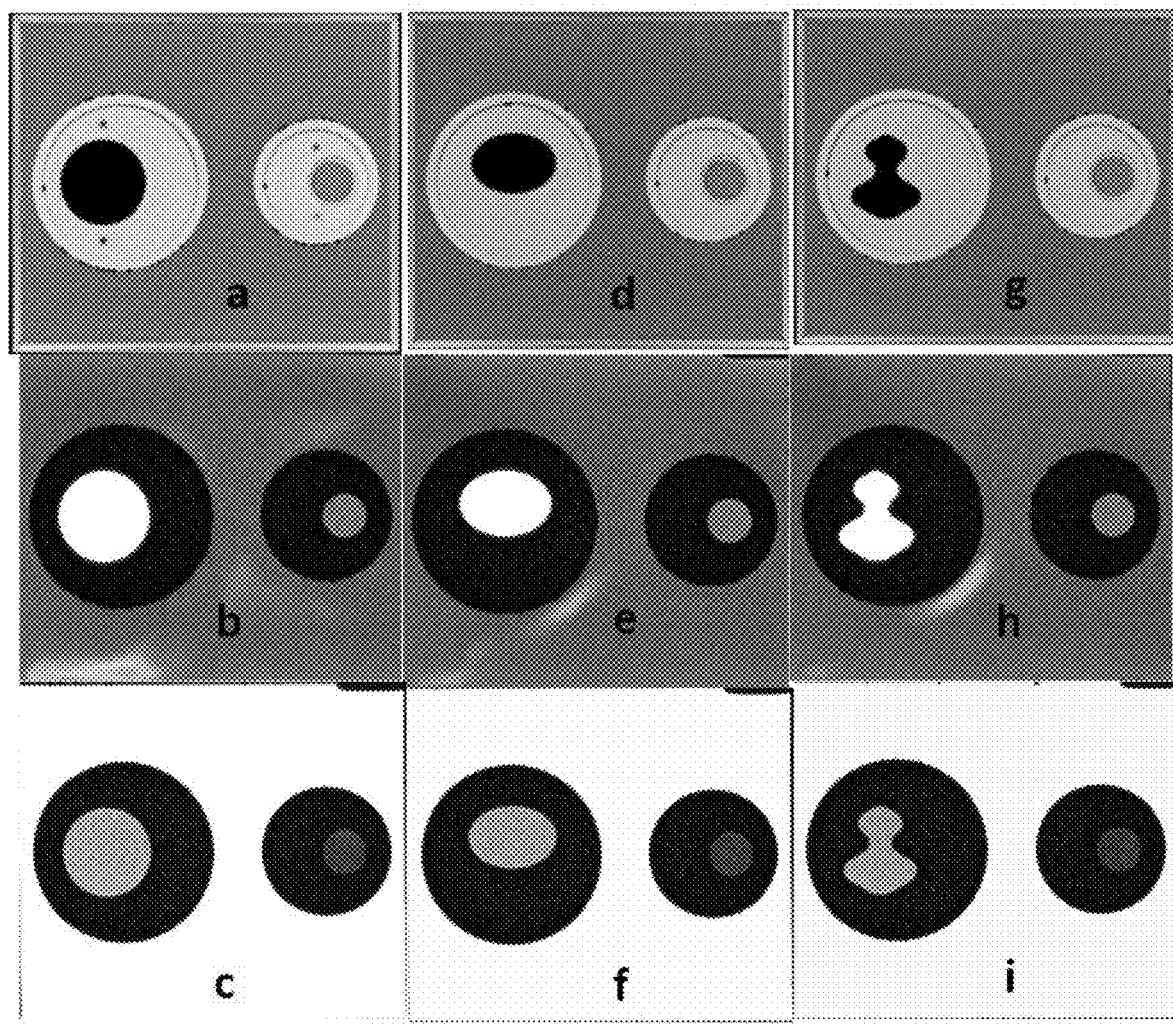
FIGS. 10A-I

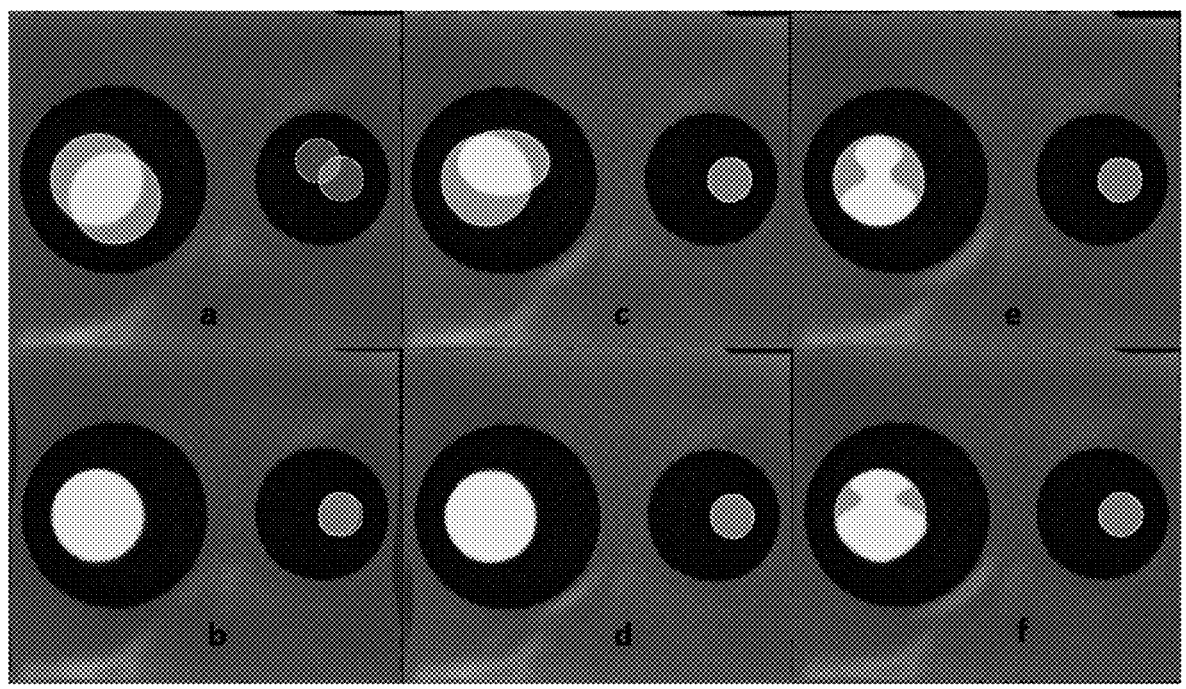
FIGS. 11A-F
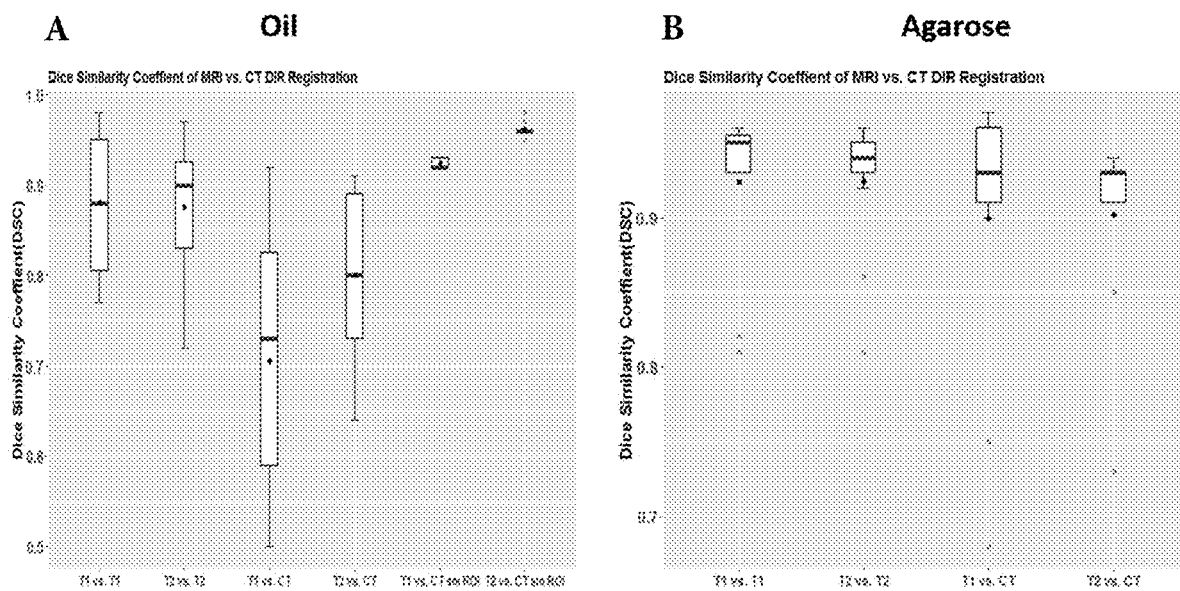
FIGS. 12A-B

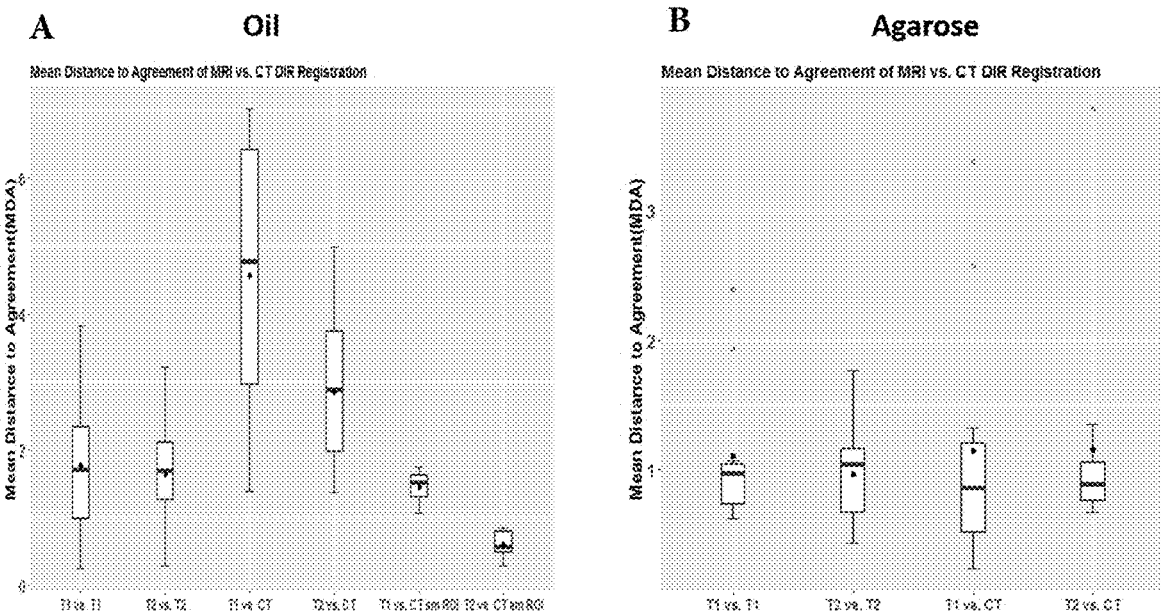
FIGS. 13A-B
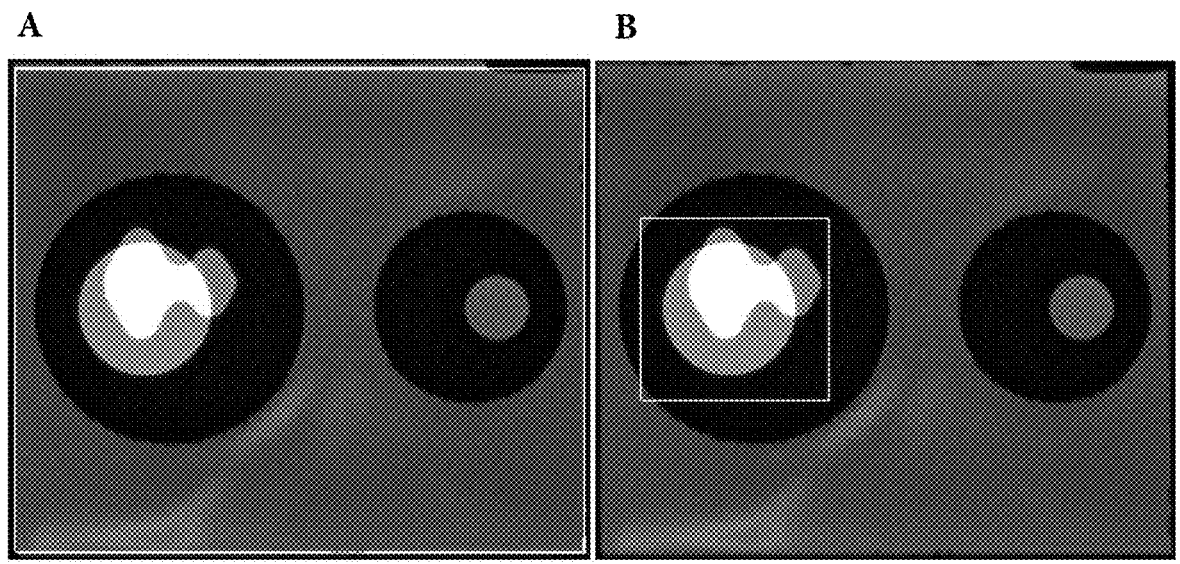
FIGS. 14A-B

DEVICES AND METHODS FOR EVALUATION OF DEFORMABLE IMAGE REGISTRATION (DIR) SYSTEMS

CROSS-REFERENCE TO RELATED APPLICATIONS

This application claims priority to U.S. Provisional Patent Application Ser. No. 62/677,440 filed May 29, 2018, the contents of which are incorporated by reference herein.

BACKGROUND INFORMATION

Many commercial software programs have been developed to perform deformable imaging registration (DIR) intending for clinical use in the past decade. The technological development calls for the quality assurance before this technique can be used in clinic. At present, most efforts to test DIR accuracy have included landmarks or contours to estimate the error in the displacement of the vector field of the DIR [1-4]. However, these evaluations are limited by the number of objects being tracked [5]. A library of virtual phantoms was introduced by Pukala et al; these were intended to resemble real cases for the head and neck DIR test [6]. These are only applicable to cases involving the same treatment site, imaging modality etc. Stanley et al. developed a patient-specific computational model phantom [7] for the prostate gland and lungs that was mainly based on the finite element modeling framework. Used as ground truth to test a DIR system, it is possible the deformation may be limited and the test may bias toward the finite element based registration algorithms. Yu et al. used an approach to generate artificial CT images with known deformation [8], this approach is limited by the registration errors of the DIR algorithm used to create the training DVFs, including the interpatient registration error and the intra-patient registration error.

A physical phantom is an important aspect of providing a complete end-to-end evaluation of the accuracy of image acquisition and the DIR process. The phantom should have defined dimensions and characteristics that can be used to test the DIR metrics under variety of conditions. Later on, a motor-controlled deformable physical phantom was designed to test lung tissue deformation accuracy [6]. However, the phantom was too large to be practical in a non-academic clinical environment, as the scale of deformation could not be accurately quantified. Wongnum et al. developed a porcine bladder phantom that simulated bladder changes that occur during the course of radiation treatment [9]. However, the phantom is hard to store after each usage and lack of quantitative measurement. Kamal et al. developed a deformable head and neck phantom using thermoplastic materials that mimicked head and neck patient anatomy [10]. The phantom also used optical markers to measure deformation and the information extracted used an optical camera via in-house software. To generate deformation, pressure was applied to the back of the phantom. The authors did not intend for their model to be used as an end-user phantom since the use of the phantom and characterization of the deformation require a considerable amount of time and expertise. Kirby et al. developed a pelvic phantom that used rubber, mineral-filled plastic, and nylon bolts to simulate a real patient [11]. However, the phantom required special knowledge and materials that are not available to all DIR users. Other anthropomorphic phantoms that have been developed for quality assurance [12, 13] have not had the ability to simulate a variety of tissue deformations and location changes. Validation method based on physician-drawn structure contours or physician-picked anatomical landmarks was also widely used [14]. This validation method is time-consuming and inevitable surfers from inter and intra-observer variability. Recently, a new virtual phantom was published on American association of physics in medicine (AAPM) task group 132 report that can be downloaded online to test DIR accuracy[15]. This virtual phantom has many limitations. It uses image offset instead of a physical phantom movement to test the rotation, translation, and orientation accuracy. The virtual phantom cannot simulate actual clinical procedure to validate the DIR accuracy. The end-to-end test of accurate data representation, image transfer, and integrity verification between image acquisition devices, image registration system cannot be performed. The phantom also used fixed inserts shape with which a contour deformation cannot be simulated and DIR accuracy test cannot be simultaneously performed under rotation, translation and deformation conditions. Also, the DIR test used an anthropomorphic pelvis phantom image which has limited contrast. The high (lung) and low (brain) contrast subject were not included and cannot be validated under such clinical conditions. Despite the fact that there are many methods to independently validate DIR systems, these are all methods which demand a great deal of resources and time.

Accordingly, a need exists for devices and methods that address the shortcomings in current apparatus and techniques for verifying the accuracy of deformable image registration systems.

SUMMARY

As explained in more detail below, exemplary embodiments of the present disclosure enable improvements in many aspects DIR system accuracy testing. In particular, improvements are noted in phantom devices designed to test the accuracy of deformable image registration (DIR) systems. Exemplary embodiments of the present disclosure include a user-friendly, low-cost phantom that can be used to test the accuracy of a deformable image registration (DIR) system and demonstrate the measurement results generated by the phantom.

Embodiments of the present disclosure include a user-friendly, low-cost physical phantom that can be used to test rigid and deformable image registration accuracy in a streamlined and seamless fashion. Exemplary embodiments utilize a variety of inserts simulating different shapes and properties of human tissue. The inserts can be arranged to simulate rigid or deformable changes in patient anatomy as compared with its reference position. Exemplary embodiments of the present disclosure include labeled dimensions, which facilitates the quantitative measurement for accuracy tests of both rigid registration and deformable registration. Exemplary embodiments can be imaged with computed tomography (CT), magnetic resonance imaging (MRI), and positron emission tomography (PET)/single-photon-emission-computed-tomography (SPECT) scanners to test DIR accuracy of multiple imaging modalities. Users can utilize different materials in the inserts, so that exemplary embodiments can test the DIR accuracy in a wide clinical situations with both high- and low-contrast media.

Certain embodiments include a device for testing the accuracy of deformable image registration systems, where the device comprises: a base; a support member coupled to the base, where the support member is configured to rotate about a first axis with respect to the base; a housing coupled to the support member, where the housing is configured to rotate about a second axis with respect to the support member; and an insert coupled to the housing, wherein the insert is configured to rotate about a third axis with respect to the housing.

Particular embodiments further comprise a first locking mechanism configured to lock the support member housing in a plurality of rotated positions with respect to the base. Some embodiments further comprise a first plurality of indications to identify the plurality of rotated positions. Specific embodiments further comprise a second locking mechanism configured to lock the housing in a plurality of angled positions with respect to the support member.

Certain embodiments further comprise a second plurality of indications to identify the plurality of angled positions. In particular embodiments, the insert comprises a cavity and a seal configured to seal the cavity. In some embodiments, the cavity is filled with a liquid and/or a solid. In specific embodiments, the cavity has an oval cross-section shape or a circular cross-section shape. In certain embodiments, the first axis is vertical and the second axis and third axis are horizontal. In particular embodiments, the insert is a first insert and the device further comprises a second insert coupled to the housing, where the second insert is configured to rotate about a fourth axis with respect to the housing. In some embodiments, the fourth axis is a horizontal axis.

Certain embodiments include a method of evaluating the accuracy of a deformable image registration system, where the method comprises: inserting a test material into the cavity of the device according to any of the preceding claims; obtaining a first image of the test material in a first reference position using an imaging procedure; moving the cavity and the test material to a second position, wherein the second position is moved from the first reference position by an actual change in position of the test material; obtaining a second image of the test material in the second position using the imaging procedure; calculating an indicated change in position of the test material using a deformable image registration system; and evaluating the accuracy of a deformable image registration system by comparing the indicated change in position of the test material to the actual change in position of the test material.

In particular embodiments, the second position is rotated about a first axis relative to the first position. In some embodiments, the second position is rotated about a second axis relative to the first position. In specific embodiments, the second position is rotated about a third axis relative to the first position. In certain embodiments, the second position is translated relative to the first position. In particular embodiments, the imaging procedure is a computed tomography (CT) procedure. In some embodiments, the imaging procedure is a magnetic resonance imaging (MRI) procedure, a positron emission tomography (PET) procedure, and/or a single-photon-emission-computed-tomography (SPECT) procedure. In specific embodiments, the test material is selected from the group consisting of: tobacco, wheat, sesame seeds, oatmeal, powdered sugar, oil, corn syrup, wax, water, dish soap, baking soda, sand and cortical bone.

The term "coupled" is defined as connected, although not necessarily directly, and not necessarily mechanically.

The use of the word "a" or "an" when used in conjunction with the term "comprising" in the claims and/or the specification may mean "one," but it is also consistent with the meaning of "one or more" or "at least one." The terms "about", "substantially" and "approximately" mean, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will be apparent to those skilled in the art from this detailed description.

BRIEF DESCRIPTION OF THE FIGURES

FIGS. 10A-I display CT and MRI images of exemplary embodiments of the present disclosure. The circle (oval/irregular) is filled with DTE oil, right side small cavity is filled with agarose gel. (a, d, g) CT images (b, e, h) T1 images (c, f, i) T2 images FIGS. 11A-F display contour shape and location changes before and after DIR for exemplary embodiments of the present disclosure. In (a, b) display a circle with fatty tissue and prostate tissue; (c, d) display an oval with fatty tissue and prostate tissue; (e, f) display an irregular shape with fatty tissue and prostate tissue for exemplary embodiments of the present disclosure.

FIGS. 12A-B display Dice similarity coefficient (DSC) for (a) Mobil DTE oil simulating fatty tissue and (b) agarose gel simulating prostate tissue for exemplary embodiments of the present disclosure.

FIGS. 13A-B display mean distance to agreement MDA for (a) Mobil DTE oil simulating fatty tissue and (b) agarose gel simulating prostate tissue for exemplary embodiments of the present disclosure.

FIGS. 14A-B display a box indicating (a) DIR using a large ROI and (b) DIR using a small ROI for exemplary embodiments of the present disclosure. The insert is filled with Mobil DTE oil simulating fatty tissue.

DETAILED DESCRIPTION OF ILLUSTRATIVE EMBODIMENTS

As discussed more fully below, exemplary embodiments of the present disclosure include devices and methods for testing the accuracy of deformable image registration (DIR) systems. For purposes of clarity, not all features will be labeled with reference numbers in each figure.

Figure 1:
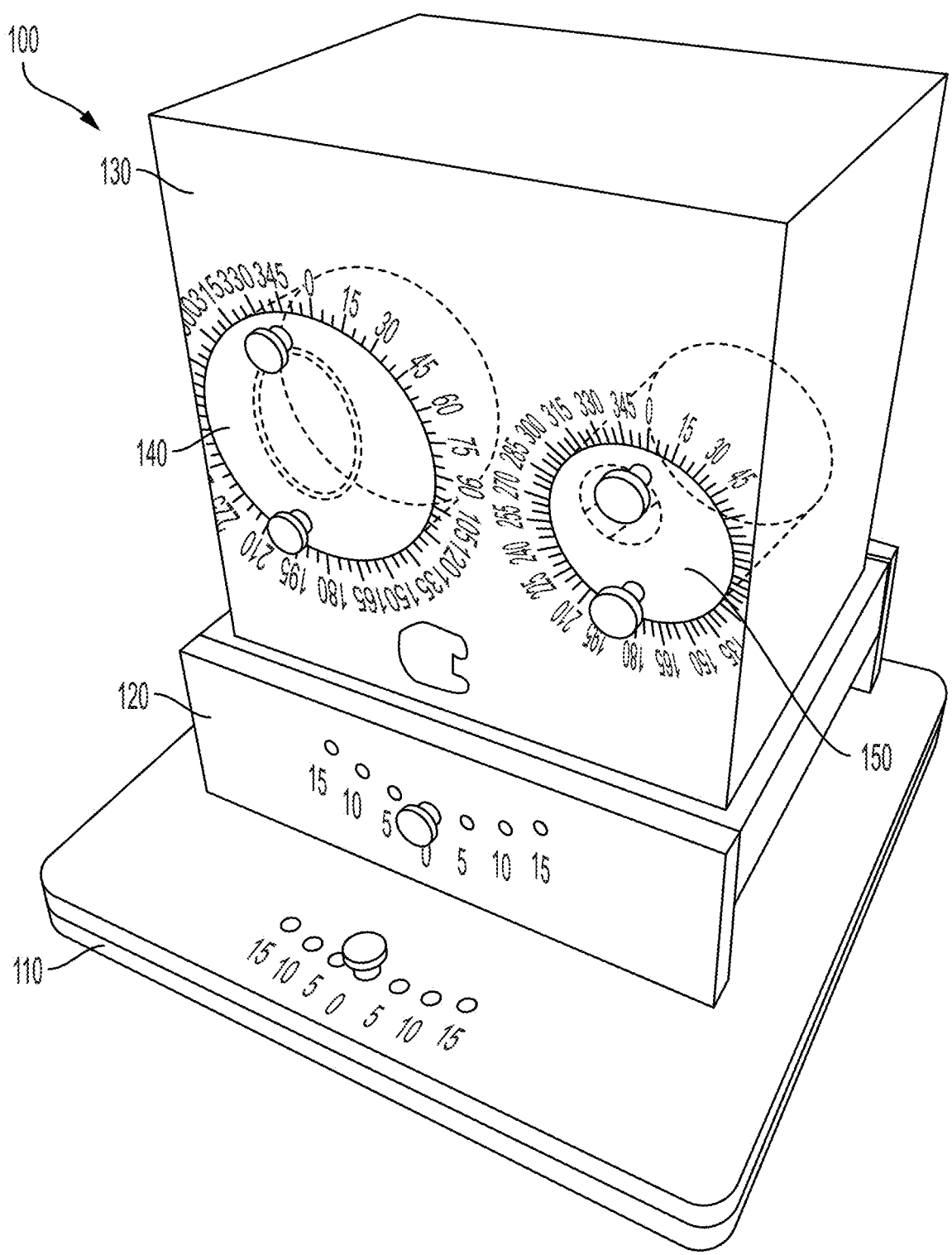
FIG. 1 displays a perspective view of a device according to an exemplary embodiment for testing the accuracy of deformable image registration (DIR) systems.
Figure 2:
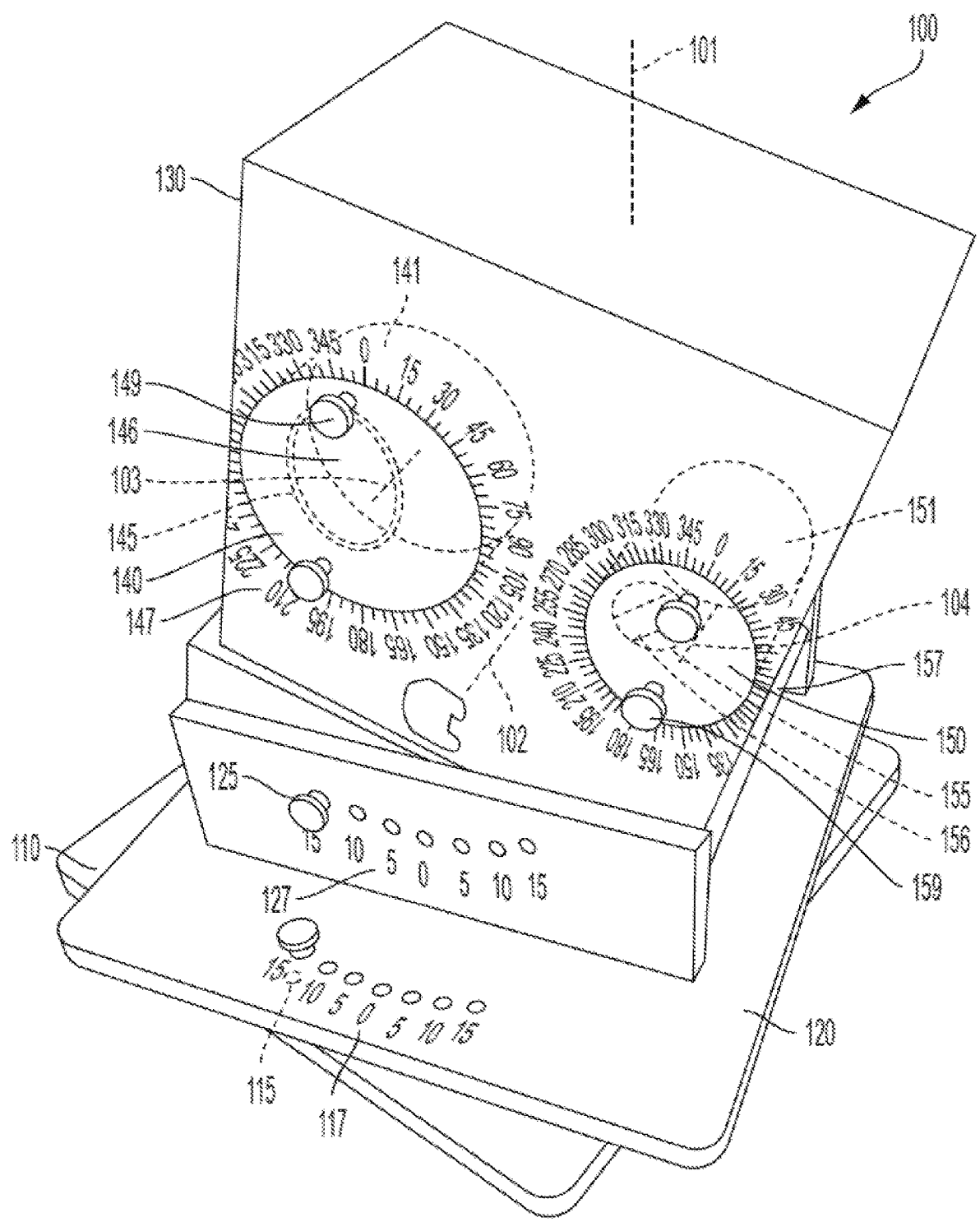
FIG. 2 displays the device according to the embodiment of FIG. 1 in a different position of that shown in FIG. 1.
Figure 3:
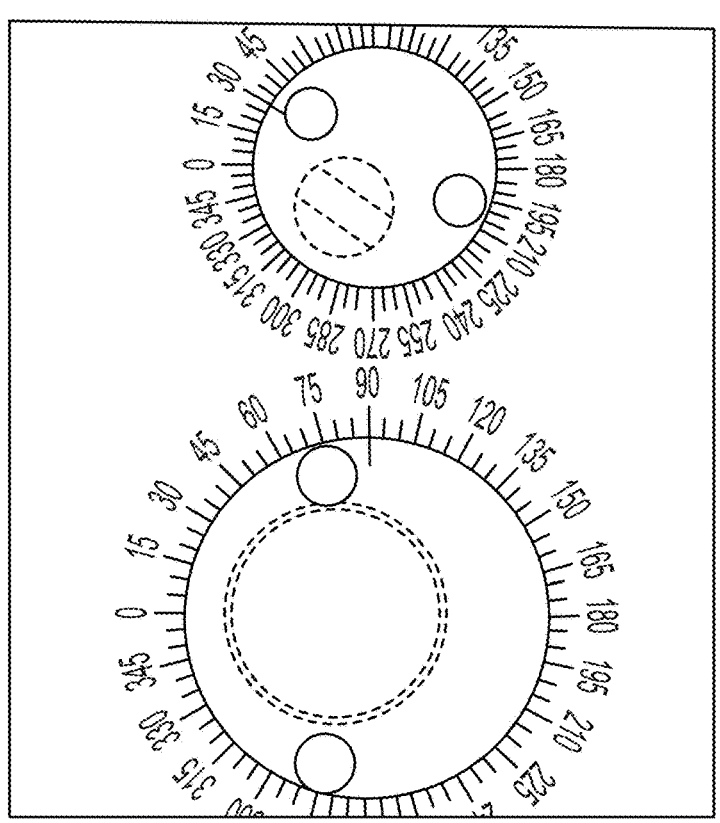
FIG. 3 displays a view of specific components of the embodiment of FIG. 1 in different positions.
Figure 3:
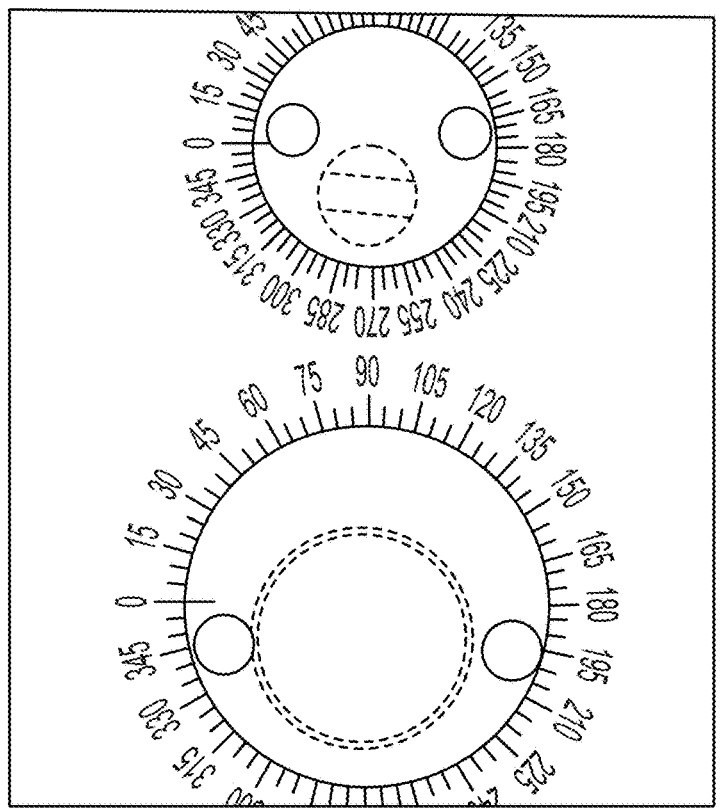

Referring initially to FIGS. 1-3, a device 100 for testing the accuracy of deformable image registration systems is shown. Device 100 comprises a base 110 and a support member 120 coupled to base 110. As shown in FIG. 2, support member 120 is configured to rotate about a first axis 101 with respect to base 110. In addition, device 100 comprises a housing 130 coupled to the support member, wherein the housing is configured to rotate about a second axis 102 with respect to support member 120. In certain embodiments, housing 130 can be filled with water for MRI testing. In the particular embodiment shown, support member 120 can rotate with respect to base 110 approximately 15 degrees in each direction from a zero reference angle. In addition, housing 130 can rotate or angle with respect to support member 120 approximately 15 degrees in each direction from a zero reference angle.

In the embodiment shown, device 100 also comprises a first insert 140 and a second insert 150, each coupled to housing 130. In a specific embodiment, housing 130 may be made of acrylic and have a density of 1.02, which is slightly heavier than water. In the illustrated embodiment, inserts 140 and 150 are coupled to housing 130 by insertion into receptacles 141 and 151, respectively. In this embodiment, first insert 140 and second insert 150 are configured to rotate within receptacles 141 and 151 about third axis 103 and fourth axis 104, respectively.

As shown in the figures, first insert 140 and second insert 150 also comprise a first cavity 145 and a second cavity 155, respectively. In certain embodiments, first cavity 145 and second cavity 155 may be filled with either a liquid or solid material suitable for testing. In addition first cavity 145 and second cavity 155 may be sealed with seals 146 and 156, respectively. In certain embodiments, seals 146 and 156 can be rubber seals configured to enclose cavities 145 and 155 and prevent leakage. In embodiments utilizing a solid test material, a seal may not be utilized to seal the cavity.

First and second cavities 145 and 155 are positioned off center within first and second inserts 140 and 150. Accordingly, when first and second inserts 140 and 150 are rotated about axes 103 and 104, respectively, the position of first and second inserts 140 and 150 are changed in the X-Y plane (e.g. the plane perpendicular to axes 103 and 104) with respect to housing 130. The rotational or angular position of inserts 140 and 150 with respect to housing 130 can be identified by a plurality indications 147 and 157 respectively.

In the illustrated embodiment, device 100 further comprises additional features to assist in moving the components relative to each other and retaining the components in the desired location. For example, device 100 may comprise a first locking mechanism 115 configured to lock support member 120 in a plurality of rotated positions (identified by indications 117) with respect to base 110. Similarly, device 100 may comprise a second locking mechanism 125 configured to lock housing 130 in a plurality of angled positions (identified by indications 127) with respect to support member 120. In the embodiment shown, first locking mechanism 115 comprises a removable pin and plurality of apertures in support member 120 and a single aperture in base 110. Second locking mechanism similarly comprises a removable pin and plurality of apertures in support member 120 and a single aperture in base 110.

During use, support member 120 can be rotated with respect to base 110 until the desired aperture in support member 120 aligns with the aperture in base 110. The pin can then be inserted through the aperture in support member 120 and into the aperture in base 110 to lock support member 120 (and housing 130, which is coupled to support member 120) into the desired rotated position. A user can also angle housing 130 with respect to support member 120 until the aperture in support member 130 aligns with the desired aperture in support member 120. The pin can then be inserted through the aperture in support member 120 and into the aperture in housing 130 to lock housing 130 into the desired angled position.

As previously mentioned, in addition to the rotated and angled positions of housing 130, each insert 140 and 150 can be rotated within receptacles 141 and 151 respectively. In this embodiment, inserts 140 and 150 do not contain separate locking mechanisms similar to those used in support member 120. Instead each insert 140 and 150 are sized and configured such that frictional forces between inserts 140 and 150 and receptacles 141 and 151, respectively, are sufficient to maintain the desired position of inserts 140 and 150. It is understood that other embodiments of the present invention may include different configurations of locking mechanisms for inserts 140 and 150, including for example, those shown in support member 120.

As shown in FIG. 2, inserts 140 and 150 comprise handles 149 and 159 to assist in rotating inserts 140 and 150 within receptacles 141 and 151, respectively. A closer view of inserts 140 and 150 are shown in two different positions in FIG. 3. In the left view of FIG. 3, inserts 140 and 150 are positioned such that a reference mark on each insert is aligned with a 0 angle in the plurality of indications 147 and 157. In the right view of FIG. 3, insert 140 is positioned such that the reference mark is aligned with a 90 degree angle (measured clockwise). Also in the right view of FIG. 3, insert 150 is positioned such that the reference mark is aligned with a 30 degree angle (measured clockwise). As shown in FIG. 3, cavities 145 and 155 are positioned off-center within inserts 140 and 150 such that when inserts 140 and 150 are rotated, the center of cavities 145 and 155 (and consequently, any test material inserted into cavities 145 and 155) are also rotated. The center locations of the cavities and test materials can simulate changes in contour location due to body deformation.

The features shown and described in device 100 can allow a user to quickly and efficiently position the components in multiple angular and rotational positions with respect to different axes to evaluate the accuracy of DIR systems. The configuration of device 100 can assist in verifying the accuracy of DIR systems by moving the components and test materials between different positions a known amount with respect to multiple axes positions. The known position change can then be compared to the position change indicated by the DIR system to evaluate the accuracy of the DIR system. In addition, different test materials can be used to simulate different tissue characteristics. Specific testing procedures are described in more detail in the working example discussed further below.

Figure 4:
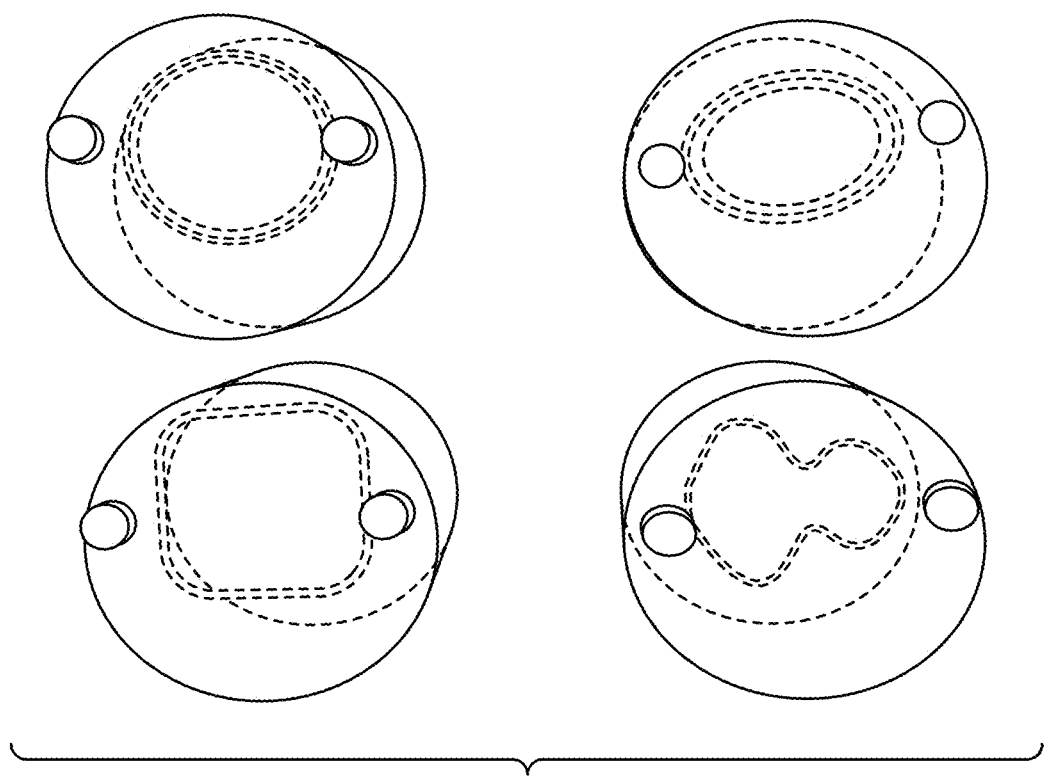
FIG. 4 displays a view of specific components with different shapes compatible with the embodiment of FIG. 1.

FIG. 4 illustrates different inserts configured for use with device 100. As shown in FIG. 4, the inserts may be configured with cavities having different cross-sections (e.g. a cross-section taken perpendicular to axis 103 when the insert is placed in receptacle 141). As shown in FIG. 4, examples of cavities include a cross-section that is circular, oval, rectangular, or "tree" shaped (e.g. a shape with a narrower central portion of the cross-section) to simulate deformed contours from the original circle. It is understood that these cavity shapes are merely examples of the many different cross-sectional shapes available, and that other cavity shapes are contemplated within the scope of this disclosure. In certain embodiments, the inserts may be filled with agarose gel, fabricated from a solution of 4% agarose gel.

Figure 5:
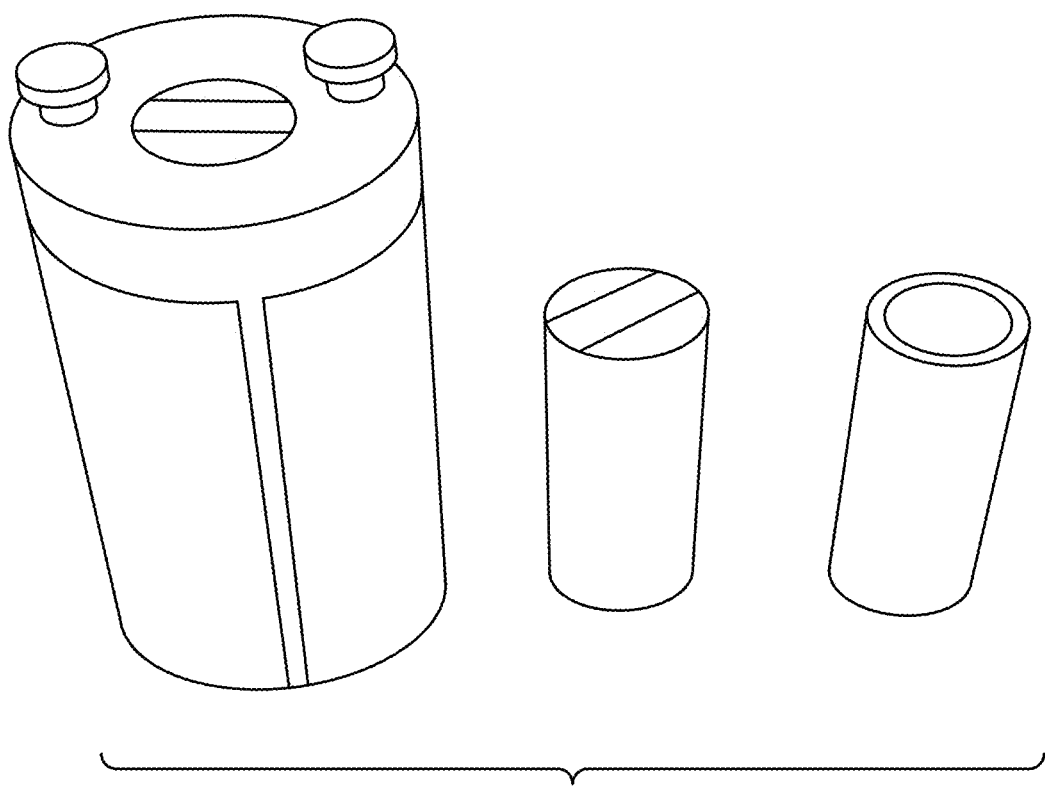
FIG. 5 displays a view of specific components compatible with the embodiment of FIG. 1 with different materials.

FIG. 5 illustrates a perspective view of insert 150 with different test materials configured for insertion into cavity 155. Materials that may be used in either cavity 145 or cavity 155 include oil, soap, oatmeal, or bone as well as other materials listed in Table 4 below in the discussion of the working example.

During operation of device 100, the test materials inserted into cavities 145 and 155 can be tilted and rotated to test rigid image registration. Inserts 140 and 150 can also be rotated, simulating contour changes in both shape and location compared to the reference (the circle cavity is typically used as the reference). Cavities 145 and 155 can be filled with solid or liquid materials with different densities, simulating different types of tissue in patients. In the specific embodiment shown, cavity 155 was constructed smaller to accommodate the size of commercially available RMI inserts (Gammex, Inc.) with known densities and test the location changes of different types of tissue with known electron densities.

WORKING EXAMPLES

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Images of the phantom were acquired using a Siemens Definition Edge computed tomography (CT) scanner with a voxel resolution of 0.98×0.98×2 mm. The phantom was scanned using the established head and neck CT protocol (35 cm FOV, 120 kvp, 2.0 mm slice thickness, and 300 mA). The CT images were then transferred to a Velocity workstation (Varian, Inc.). To obtain the phantom reference image, the phantom was placed on the base with a large circle insert filled with DTC oil and a small circle insert filled with a bone plug (CB2 30%) from an RMI phantom (Gammex, Inc.). DTE oil has a density of 0.95 g/ml, simulating soft tissue. The bone insert has a density of 1.33 g/ml. All of the alignment marks for the position (insert rotation, phantom tilting, and rotation) were set at 0 degree when acquiring the reference image set. Contours were created for both large and small inserts on the basis of a predefined threshold CT# range.

I. Image Registration Tests

A. Rigid Image Registration Test for Rotation and Translation

Figure 6:
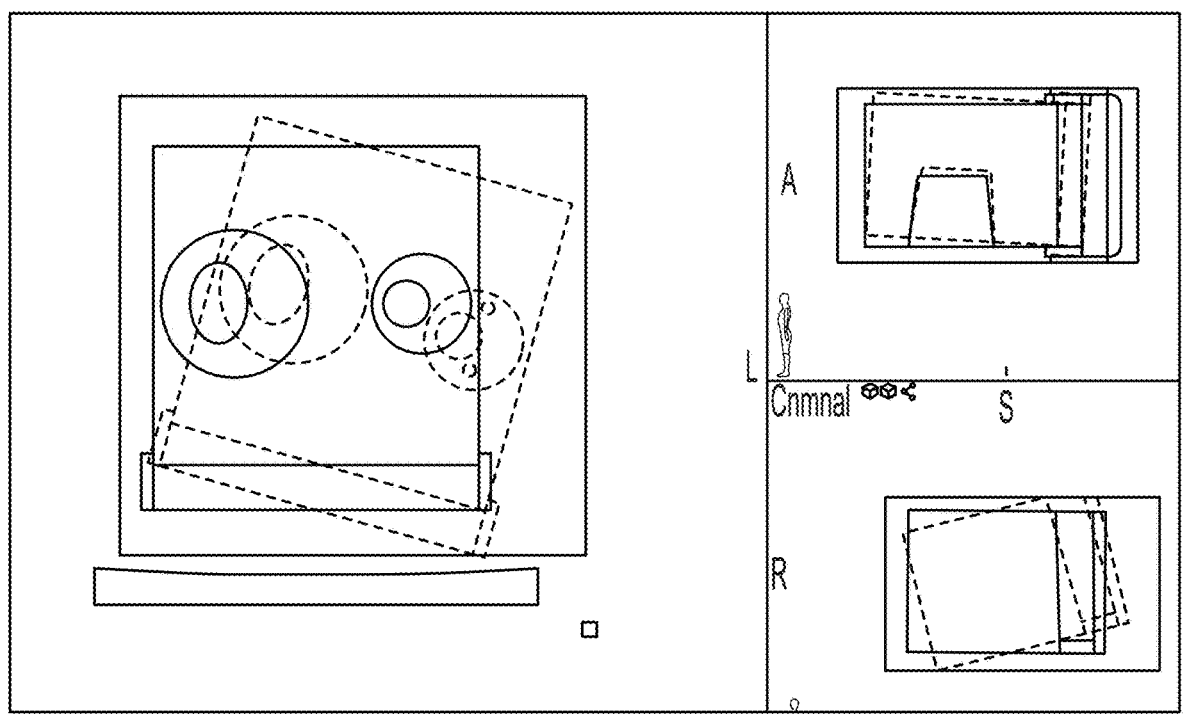
FIG. 6 displays image scans of the embodiment of FIG. 1 in different positions.

After the reference image scans had been completed, new phantom images (also called secondary images) were acquired by tilting and rotating the base by 5 and 15 degrees counter-clockwise, respectively as shown in FIG. 6, to test the system's rigid registration under the predetermined degrees of angle of rotation.

For the translation accuracy tests, phantom secondary images were acquired by rotating both the large circle insert and the small circle inserts to create a location change of the insert in the X and Y directions compared to the original reference images. For these tests, the inventors used a large insert filled with DTE oil and a small insert filled with a bone plug to simulate location changes for soft tissue and bone.

Figure 7:
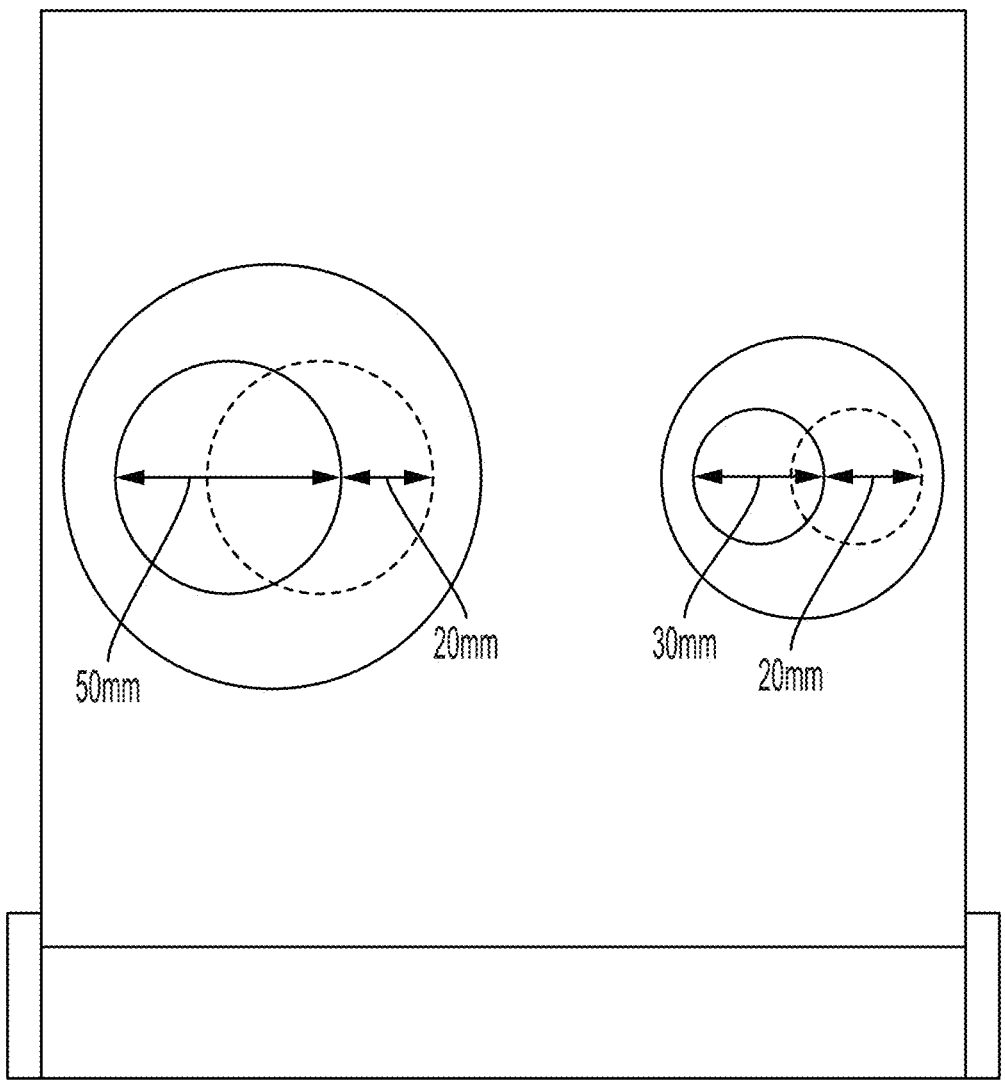
FIG. 7 displays image scans of the embodiment of FIG. 1 in different positions.
Figure 8:
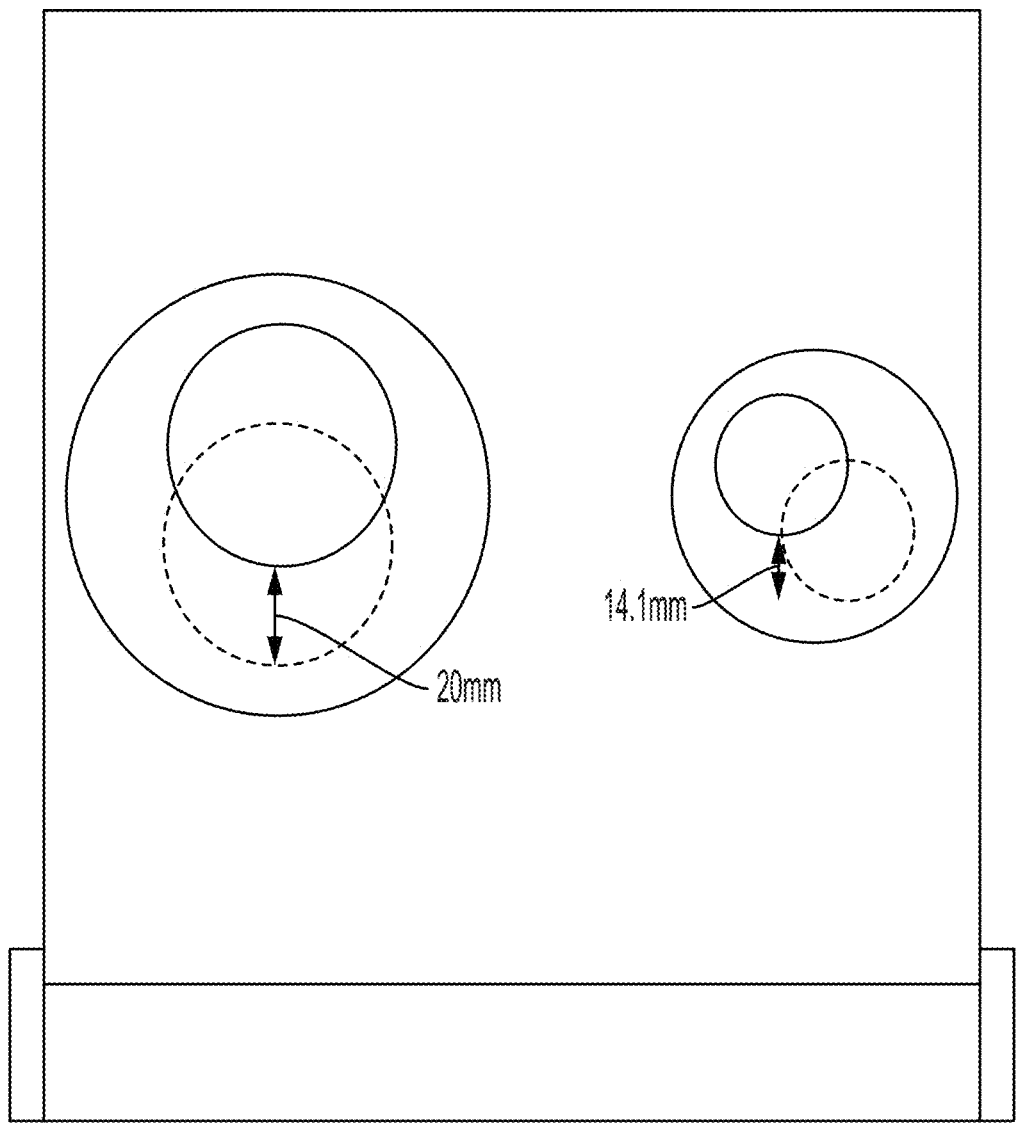
FIG. 8 displays image scans of the embodiment of FIG. 1 in different positions.
Figure 9D:
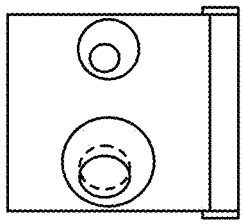
FIGS. 9A-K display image scans of the embodiment of FIG. 1 in different positions with different inserts.
Figure 9C:
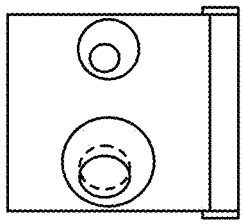
Figure 9B:
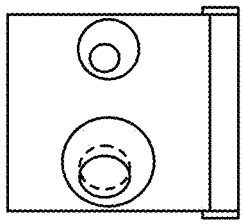
Figure 9A:
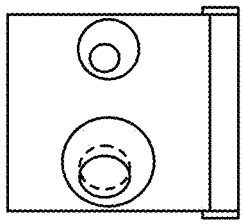
Figure 9H:
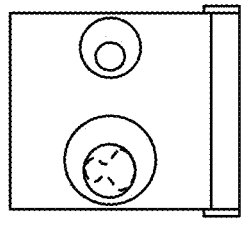
Figure 9G:
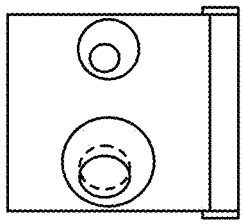
Figure 9F:
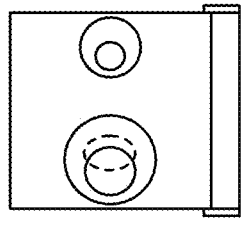
Figure 9E:
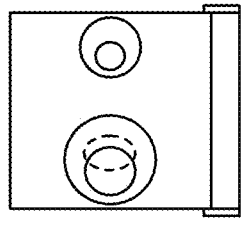
Figure 9K:
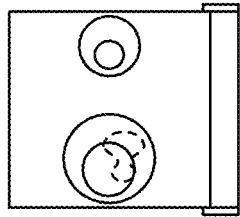
Figure 9J:
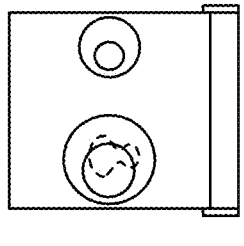
Figure 9I:
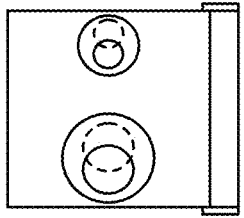

For the X direction movement test, the large insert (DTE oil) and small insert (bone) were rotated from 0 degree to 180 degrees, respectively, compared to the reference location. This created a distance displacement of 20 mm in the X direction for both densities used, as shown in FIG. 7. To test movement in the Y direction, the large insert was rotated from 270 degrees to 90 degrees, and the small insert was rotated from 225 degrees to 45 degrees, simulating displacements of 20 mm and 14.1 mm, respectively, in the Y direction, as shown in FIG. 8. The images were first registered using manual alignment by shifting and rotating the secondary image. A region of interest that encompassed the whole phantom was drawn. The velocity rigid registration process was used to align the two image sets.

B. DIR Test

The secondary images for the DIR accuracy tests were acquired by replacing and rotating the circular and oval- and tree-shaped inserts. This simulated tissue deformation from a circular shape to another circular shape or an irregular shape (oval or tree). Rotating the inserts to a different degree simulates the location changes for the contours of interest.

FIG. 9 shows the 11 combined contour deformation scenarios that simulated both contour deformation and location changes. The contour deformation and location change were simulated by changing and rotating the inserts.

The small circle (filled with the bone plug) has both rotation and non-rotation conditions, simulating the clinical condition in which only soft tissue has deformation and there is no bone deformation. The investigators used the rigid and deformable multi-pass tool in the Velocity software program to perform the DIR process for all of the selected secondary image sets. All of the corresponding contours were propagated into the secondary image sets. The labels in the different panels of FIG. 9 indicate the following positions: (a) circle rotation=90 degrees, bone rotation=90 degrees. (b) circle rotation=180 degrees, bone rotation=180 degrees. (c) circle rotation=270 degrees, bone rotation=225 degrees. (d) oval rotation=0 degree, bone rotation=0 degree. (e) oval rotation=90 degrees, bone rotation=0 degree. (f) oval rotation=180 degrees, bone rotation=0 degree. (g) oval rotation=270 degrees, bone rotation=0 degree. (h) tree rotation=0 degree, bone rotation=0 degree. (i) tree rotation=90 degrees, bone rotation=0 degree. (j) tree rotation=180 degrees, bone rotation=0 degree. (k) tree rotation=270 degrees, bone rotation=0 degree.

The accuracy of the DIR of a contour can be characterized by three major factors: the conformity index (also called the Dice coefficient index), the maximum surface distance (also called the Hausdorff distance), and the volume ratio. The conformity index is defined as the ratio of twice the overlap of two structures over the sum of their volumes. This method is widely used in DIR comparisons [16].

The conformity index ranged from 0 to 1, denotes the degree of a perfect match between the two structures according to the following formula:

$$D(A,B) = 2|A \text{ and } B|/(|A|+|B|),$$

where A and B are the two sets. More simply, this formula represents the size of the union of two sets divided by the average size of the two sets. A value of 0 indicates no overlap, and a value of 1 indicates perfect agreement. Higher numbers indicate better agreement.

The maximum surface distance is the greatest of all the distances from a point in the original contour to the closest point of the deformed contour:

$$h(A, B) = \max_{a \in A} \left\{ \min_{b \in B} \{d(a, b)\} \right\},$$

where a and b are points of sets A and B, respectively. The volume ratio is defined as the ratio of the deformed volume to the reference volume:

Volume ratio=deformed volume (cc)/reference volume (cc)

II. Results

As indicated in Table 1, there were eight combined scenarios for the phantom rotation and rigid registration tests. The mean absolute difference between the measured and indicated angles was 0.13 degree. Table 2 shows the phantom translation test results. The mean difference in the measured distance between the movement of the large circle (Mobil DTE™ oil) and small circle (bone) was 1 mm in both the X and Y directions.

TABLE 1

Measured phantom rotation angle vs. the indicated angle.
Rotation Test

|  | Indicated tilting angle (degree) | Measured tilting angle (degree) | Absolute difference (degree) | Indicated rotation angle (degree) | Measured rotation angle (degree) | Absolute difference (degree) |
| --- | --- | --- | --- | --- | --- | --- |
| -reference T0B0 | 0 | 0 | 0 | 0 | 0 | 0 |
| T5B0 | 5 | 5.6 | 0.6 | 0 | 0.0 | 0.0 |
| T15B0 | 15 | 15.2 | 0.2 | 0 | 0.0 | 0.0 |
| T0B5 | 0 | 0.6 | 0.6 | 5 | 5.0 | 0.0 |
| T0B15 | 0 | 0.1 | 0.07 | 15 | 15.1 | 0.1 |
| T5B5 | 5 | 5.5 | 0.5 | 5 | 5.1 | 0.1 |
| T5B15 | 5 | 5.7 | 0.7 | 15 | 14.9 | 0.1 |
| T15B5 | 15 | 15.4 | 0.4 | 5 | 4.8 | 0.2 |
| T15B15 | 15 | 15.9 | 0.9 | 15 | 14.5 | 0.5 |
| Mean |  |  | 0.50 |  |  | 0.13 |

T = phantom tilted degree,
B = phantom base rotation degree.

TABLE 2

Phantom translation test results
Translation Test

|  | Large circle moved distance from insert rotation (mm) | Measured large circle moved distance (mm) | Small circle moved distance from insert rotation (mm) | Measured small circle moved distance (mm) | Mean difference (mm) |
| --- | --- | --- | --- | --- | --- |
| X direction | 20 | 19.6 | 20 | 18.4 | 1.0 |
| Y-direction | 20 | 20.8 | 14.1 | 15.3 | 1.0 |

The DIR test results are shown in Table 3. The mean conformity index value was 0.93 for soft tissue contour (circular and oval- and tree-shaped inserts filled with DTE oil) and bone contour. Similarly, the maximum surface distances were 8.3 mm for soft tissue contour and 4.56 mm for bone. The mean surface distances were 0.95 and 0.79, respectively. The mean volume ratios between the deformed volume and the reference volume were 1.13 for soft tissue and 1.12 for bone.

TABLE 4-continued

List of materials that can be used to fill the cavity

| Substance | Density (g/ml) |
|---|---|
| DTE oil | 0.95 |
| Water | 1 |
| Dish soap | 1.03 |

TABLE 3

DIR test results
Rigid + deformrable multipass

| | Conformality | | Surface Distance Metrics (mm) | | | | Volume Test | | | | | |
|---|---|---|---|---|---|---|---|---|---|---|---|---|
| | (Dice) | | Max(HD) | | Mean | | reference | deformed volume (cc) | Volume | reference | deformed | Volume |
| -reference circle0 Bone 0 | circle/ olive/ tree | bone | circle/ olive/ tree | bone | circle/ olive/ tree | bone | volume (cc) circle | circle/ olive/ tree | Ratio (deformed/ reference) | volume (cc) bone | volume (cc) bone | Ratio (deformed/ reference) |
| Circle 90 Bone 45 | 0.95 | 0.93 | 5.80 | 4.80 | 0.64 | 0.87 | 91.90 | 100.60 | 1.09 | 44.40 | 49.60 | 1.12 |
| Circle 180 Bone 180 | 0.92 | 0.85 | 5.80 | 7.80 | 1.29 | 1.71 | 91.90 | 108.40 | 1.18 | 44.40 | 59.30 | 1.34 |
| Circle 270 Bone 225 | 0.95 | 0.90 | 6.90 | 11.70 | 0.59 | 1.20 | 91.90 | 100.30 | 1.09 | 44.40 | 52.50 | 1.18 |
| Olive 0 Bone 0 | 0.96 | 0.97 | 8.70 | 2.93 | 0.47 | 0.45 | 91.90 | 98.20 | 1.07 | 44.40 | 47.30 | 1.07 |
| Olive 90 Bone 0 | 0.95 | 0.94 | 7.80 | 4.00 | 0.54 | 0.74 | 91.90 | 100.30 | 1.09 | 44.40 | 49.20 | 1.11 |
| Olive 180 Bone 0 | 0.93 | 0.96 | 6.26 | 2.18 | 1.08 | 0.52 | 91.90 | 100.60 | 1.09 | 44.40 | 47.00 | 1.06 |
| Olive 270 Bone 0 | 0.93 | 0.93 | 5.80 | 4.00 | 1.07 | 0.82 | 91.90 | 104.50 | 1.14 | 44.40 | 49.80 | 1.12 |
| Tree 0 Bone 0 | 0.94 | 0.94 | 7.80 | 2.90 | 0.68 | 0.61 | 91.90 | 102.30 | 1.11 | 44.40 | 48.10 | 1.08 |
| Tree 90 Bone 0 | 0.90 | 0.94 | 11.90 | 2.90 | 1.10 | 0.57 | 91.90 | 109.30 | 1.19 | 44.40 | 49.40 | 1.11 |
| Tree 180 Bone 0 | 0.91 | 0.95 | 9.60 | 4.00 | 1.30 | 0.63 | 91.90 | 104.70 | 1.14 | 44.40 | 47.80 | 1.08 |
| Tree 270 Bone 0 | 0.88 | 0.95 | 14.90 | 2.90 | 1.70 | 0.58 | 91.90 | 113.90 | 1.24 | 44.40 | 48.10 | 1.08 |
| Mean | 0.93 | 0.93 | 8.30 | 4.56 | 0.95 | 0.79 | 91.90 | 103.92 | 1.13 | 44.40 | 49.83 | 1.12 |

All of the accuracy test results were well within the manufacturer's specified range. The velocity DIR system uses a B-spline algorithm and mutual information-based registration. The inventors also performed DIR tests using materials of different densities. As indicated in Table 4, a variety of materials can be used for the test. The inventors selected water, dish soap, and oatmeal to test contours that have a similar density (i.e., dish soap [density=1.03 g/ml] to DTE oil [density=0.95 g/ml]) on DIR registration, simulating tumor shrinkage or softening during the course of treatment. The inventors also tested low-density material deformation (i.e., oatmeal to oatmeal [density=0.56 g/ml]), simulating lung tissue deformation. The results are shown in Table 5.

TABLE 4

List of materials that can be used to fill the cavity

| Substance | Density (g/ml) |
|---|---|
| Air | 0 |
| Tobacco, flaked | 0.03 |
| Wheat, flaked | 0.11 |
| Sesame seeds | 0.43 |
| Dry Oatmeal | 0.56 |
| Sugar, powdered | 0.8 |
| Oval oil | 0.91 |
| Corn syrup | 0.92 |
| Wax | 0.95 |

TABLE 4-continued

List of materials that can be used to fill the cavity

| Substance | Density (g/ml) |
|---|---|
| Baking soda and, dry | 1.12 |
| | 1.28 |
| Cortical Bone | 1.7 |

TABLE 5

Deformable registration test with materials of different densities
Deformable registration test with different density material

| reference image (circle) vs. 2nd image (tree) | Conformality (Dice) | Surface Distance Metrics (mm) | |
|---|---|---|---|
| | | Max (HD) | Mean |
| DTE oil (reference) | 0.94 | 7.8 | 0.6 |
| Water to DTE Oil | 0.95 | 5.8 | 0.78 |
| Dish Soap to DTE Oil | 0.94 | 10.3 | 0.71 |
| Oat Meal to Oat Meal | 0.93 | 4.9 | 0.11 |

Discussion

The tested embodiment utilizes an elegant design constructed out of acrylic and includes a variety of inserts that simulate different tissue shapes and properties. It can simulate deformations and location changes in patient anatomy by changing the rotations of both the phantom and the inserts. Both rigid and deformable image registration accuracy can be tested with this single phantom effectively and efficiently to ensure system performance.

It has been reported that the accuracy of DIR algorithms has been tested inconsistently [17-21]. A multi-institution study was conducted to provide a consistent and direct comparison of the various algorithms and the performance of different systems [22]. The report indicated that there were large discrepancies in shifts and the DIR accuracy were equivalent to the voxel size. Our goal in this study was to design a phantom that could be used by any cancer institution that uses DIR in the clinic, either for commissioning or for quality assurance after DIR software upgrades. The phantom is made of acrylic and uses the existing plugs from an RMI phantom, which are available at most cancer treatment centers. It also requires less crafting, making it favorable for mass production at a low cost. The inventors believe it has potential as a prototype phantom for national accreditation purposes to standardize the performance evaluation of all DIR systems across the country.

Multimodality DIR is valuable in surgical planning that requires clear delineation of soft tissue (e.g., spinal cord, cerebrospinal fluid, and nerve bundles). There is also a substantial clinical need for magnetic resonance imaging (MRI) and CT registration in radiation oncology, especially for central nervous system sites. Reaungamornrat et al. used target points from real patient MRIs to test the modality-independent neighborhood descriptor demons, a deformable registration of MR and CT [23]. Image registration errors on commercial software using MRI have not been widely studied. Recently, there has been research on the use of synthetic images derived from patient longitudinal deformations and porcine phantoms implanted with markers for MRI DIR accuracy tests [24]. The phantom that the inventors developed in this study can also be imaged with MRI and includes inserts that can be filled with materials of various densities simulating tissue that has low imaging contrast (e.g. brain).

The DIR software provided by many vendors provides tools such as CT to CT registration, positron emission tomography-CT fusion, MRI to CT fusion, custom contour atlas creation, dose deformation, and adaptive re-contouring. The focus of this phantom design is rigid image registration, DIR, and adaptive re-contouring accuracy tests. Our phantom can be filled with a solution mixed with F-18 or Tc-99m for positron emission tomography/single-photon emission CT imaging registration tests or embedded with thermoluminescence dosimeter (TLDs) for dose deformation validation.

There are limitations in the current study. Although the preliminary test results indicate that the Velocity adaptive re-contouring tool provides reasonably good estimates of contours generated from the original CT image set, the inserts were filled with uniform contents (DTE oil, dish soap, oatmeal, and bone) and contoured accordingly. Actual patient contours will have varied CT# within the volume (i.e., the clinical target volume encompassing the gross tumor and surrounding tissue). As a result, the inserts will need to be tested with mixed contents in the future.

In summary, the mean rotation accuracies were 0.50 and 0.13 degree, respectively, in the X-Y (axial) and X-Z (coronal) planes. The mean translation accuracy was 1 mm in both the X and Y direction, tested in soft tissue and bone. The DIR accuracies for soft tissue and bone were 0.93 (mean Dice similarity coefficient), 8.3 mm and 4.5 mm (mean Hausdouff distance), 0.95 mm and 0.79 mm (mean distance), and 1.13 and 1.12 (mean volume ratio) for soft tissue content (DTE oil) and bone, respectively.

Conclusions

Exemplary embodiments of the present disclosure present an efficient design and can be constructed at a low cost. Exemplary embodiments will allow DIR systems to be effectively and efficiently verified to ensure system performance and provide a complete end-to-end evaluation of the accuracy of a DIR system. Exemplary embodiments include defined dimensions and a variety of inserts that can change the shape and contents, simulating different tissue characteristics. In addition, exemplary embodiments can be constructed at a low cost, and thus, could be widely accessible to clinics throughout the country and world.

Additional Results

Additional test results are discussed and shown below with an embodiment of the phantom constructed out of acrylic and filled with water and included a variety of inserts that simulate different tissue shapes and properties. Deformations and location changes in patient anatomy are simulated by changing the rotations of the phantom and inserts. The inventors used Varian Velocity version 4.0 DIR software and CT (head and neck protocol) and MR (T1- and T2-weighted [T1 and T2] head protocols) images to test across image modality (MRI vs CT) and within the same image modality (MRI vs MRI) in 11 rotation deformation scenarios. The inventors used large inserts filled with Mobil DTE oil to simulate fatty tissue and small inserts filled with agarose gel to simulate tissue that was slightly denser than water (i.e., prostate). Contours of all inserts were generated prior to DIR to provide the ground truth of contour size and shape. After DIR, all deformed contours were compared with the original contours. The Dice similarity coefficient (DSC) and mean distance to agreement (MDA) were used to quantitatively validate DIR accuracy. The inventors also used large and small regions of interest (ROIs) during DIR in the crossing image modality to simulate validation of DIR accuracy for organs at risk (OARs) and individual clinical target volume (CTV) contour propagation, respectively.

Results

The inventors found no significant difference in DIR accuracy for T1- and T2-weighted MRI ($p>0.05$). For the fatty tissue and prostate simulations, the means and standard deviation (±s.d.s) of DSC were 0.88±0.08 and 0.92±0.05 (T1 vs. T1); 0.88±0.08 and 0.92±0.04 (T2 vs. T2). The means (±s.d.s) of MDA were 1.1 mm±0.53 (T1) and 0.96 mm±0.37 (T2). DIR was less accurate for the crossing image modality than for the same modality and less accurate for T1 vs. CT than for T2 vs. CT ($p<0.001$). The means and s.d.s of DSC were 0.71±0.14 and 0.90±0.09 (T1 vs. CT) and 0.80±0.09 and 0.90±0.06 (T2 vs. CT); the means and s.d.s of MDA were 4.57 mm±1.95 mm and 1.15 mm±0.92 mm (T1 vs. CT) and 2.86 mm±1.08 mm and 1.16 mm±0.85 mm (T2 vs. CT). For the crossing image modality, a small ROI improved DIR accuracy for both T1 and T2 images: $DSC_{large}=0.71$, $DSC_{small}=0.92$ (T1, $p<0.0003$) and $MDA_{large}=4.5$ mm, $MDA_{small}=1.5$ mm (T1, $p<0.0003$) vs. $DSC_{large}=0.8$, $DSC_{small}=0.96$ (T2, $p<0.001$) and $MDA_{large}=2.86$ mm, $MDA_{small}=0.61$ mm (T2, $p<0.0001$).

Conclusion

End-to-end MRI DIR accuracy was validated with standard physical phantom. T2 images had superior DIR accuracy compared to T1 images. A small ROI should be used to improve DIR accuracy for target contour propagation. The phantom has a simple design and allows for seamless testing of DIR. PACS number: 89.20.-a, 87.57.nj, 87.55.dk, 87.55.Qr.

The use of magnetic resonance imaging (MRI) as a radiation therapy simulator has gained popularity because it provides superior soft tissue contrast compared with conventional computed tomography (CT) without exposing the patient to ionizing radiation. It also provides more accurate target delineation. Co-registration using deformable image registration (DIR) of the two image sets prior to and during patient treatment is used to create a foundation for target delineation (Palmer et al., 2018) for adaptive radiation therapy. However, DIR errors on commercial software using MRI have not been widely reported.

Ger et al. evaluated a DIR system using synthetic images derived from patient longitudinal deformations and a porcine phantom with implanted markers (Ger et al., 2017). Tait et al. investigated the use of DIR in gynecologic brachytherapy to combine MRI guidance and CT-based planning for efficient and optimal brachytherapy source placement. DIR provided MRI guidance in CT-based planning facilitating improved target volume delineation, dose escalation while reducing toxicity to the surrounding organs at risk (Tait et al., 2016). The clinical stability of DIR is affected by several factors, including degree of freedom algorithms, image input quality, and regularization methods (Brock et al., 2017). Several additional factors can also affect the quality of image registration, including user experience and method (Kadoya et al., 2016). An MRI-compatible phantom is needed that is sophisticated enough to benchmark the uncertainties introduced by MRI-only treatment planning and MR-image-guided radiation therapy.

Cunningham et al. developed a pelvis phantom to validate the MR-image-guided radiation therapy workflow (Cunningham et al., 2018). However, it cannot be used to test DIR accuracy due to lack of quantitative measurement. De Brabandere et al. developed a CT- and MRI-compatible prostate phantom that can be used to assess the accuracy of 3D image-based reconstruction techniques (De Brabandere et al., 2006). Niebuhr et al. developed the ADAM-pelvis phantom, which is anthropomorphic, deformable, and multimodal (Niebuhr et al., 2019). However, there is no standard physical phantom that provides end-to-end testing of the accuracy of DIR in MRI.

The American Association of Physicists in Medicine (AAPM) task group report 132 (Brock et al., 2017) describes digital phantom images generated by ImSimQA software (Oncology System Limited, Shrewsbury, UK) that can be downloaded for MRI DIR testing. However, there are many limitations to digital phantoms; they cannot simulate the wide range of characteristics that are due to image acquisition technique, noise level, image quality, and associated artifacts. Therefore, digital phantoms are incapable of facilitating end-to-end tests for individual clinics with specific MRI units and DIR systems.

The aim of this study was to use a physical phantom to evaluate the DIR accuracy of MRI using T1-weighted (T1) and T2-weighted (T2) MRI and CT: between the same imaging modality (T1 vs. T1 and T2 vs. T2) and crossing imaging modalities (T1 vs. CT and T2 vs. CT). The inventors also assessed DIR accuracy in crossing image modalities using different sizes of regions of interest (ROIs) selected from the phantom volume.

Methods and Materials
Phantom Design

Previous embodiments (discussed above) can be used to test the accuracy of DIR (Wu et al., 2019). The phantom is constructed out of acrylic and includes a variety of inserts that simulate different tissue shapes and properties. Deformations and location changes in patient anatomy are simulated by changing the rotations of both the phantom and the inserts.

Testing on this embodiment included three large cavity inserts of different shapes: circle, oval and irregular, simulating deformed contours from the original circle. The oval shape represents commonly deformed contours, and the irregular shapes simulate irregularly deformed contours. For DIR testing, the inserts were rotated to simulate contour changes in the shape and location compared to the circle, which is usually used as the reference.

For MRI testing, the Wuphantom was modified on the body base that was filled with water, which is visible on MRI as background. Each large insert cavity was filled with Mobil DTE oil (ExxonMobil, Houston, Tex., USA) with a density of 0.95 g/ml, representing fatty tissue with volumes of 97.5 ml, 68.8 ml, and 61.1 ml, respectively. A smaller cavity was constructed on the right side of the phantom that has an insert containing agarose gel fabricated from a solution of 27.4 ml of 4% (w/v) agarose gel, simulating tissue that is slightly denser than water. Agarose gel was fabricated by mixing a water and agarose slurry in a loosely capped Erlenmeyer flask with magnetic stirring and heating. Once the agarose was completely dissolved, the heat was turned off and the molten solution was cast in the phantom as the agarose polymerized into a semi-solid gel. To change the image contrast, 0%, 0.5%, 1.0%, 2.0%, and 4% agarose mixtures can be used. 4% agarose gel has a similar density to that of prostate tissue, with a derived density of 1.036 g/ml, and has similar visualization characteristics on MRI as does prostate tissue (Mitchell et al., 1986). The inventors chose Mobil DTE oil and agarose gel for the inserts to study low-contrast subjects.

2.2. MR and CT Image Acquisition

MRI scans were performed using a 1.5 T MRI Siemens MAGNETOM Aera scanner (Siemens, Inc., USA) with 8×2-element flat head coils and a flat insert table. The inventors selected 130 slices with an axial field of view of 25.6 cm and a superior-inferior slice direction (slice thickness of 2 mm) to cover the spatial region encompassing the entire phantom volume. The T1 MRI sequence was an echo sequence with flip angle 20°, repetition time 7.38 ms, echo time 4.77 ms, pixel bandwidth 400 Hz, acquisition pixel size 0.5 mm×0.5 mm (matrix size 512×512), and zero filling interpolation. The T2-weighted MRI sequence was a fast spin echo sequence with flip angle 180°, repetition time 4800 ms, echo time 80 ms, pixel bandwidth 300 Hz, slice thickness 2 mm, acquisition pixel size 0.5 mm×0.5 mm (matrix size 512×512), and zero filling interpolation. Both T1 and T2 images had reconstructed voxel sizes of 0.5 mm×0.5 mm×2 mm.

CT images were also acquired using a Siemens Definition Edge CT scanner with a voxel resolution of 0.98 mm×0.98 mm×2 mm. The scan was performed using the established head and neck CT protocol (35 cm field of view, 120 kvp, 2.0-mm slice thickness, and 300 mA). All of the MR and CT images were transferred to a Velocity Workstation version 4.0 (Varian Medical Systems, Palo Alto, Calif., USA).

For the acquisition of the reference image set, the phantom was placed on the base with 0° of tilting and rotation, and the alignment marks (insert rotation, phantom tilting, and rotation) were set at 0°, the circle was filled with DTE oil in the left large cavity, and the right-side small cavity was filled with agarose gel. The images for the DIR accuracy tests were acquired by replacing the circular insert by the oval/irregular-shaped inserts, and the inserts to different degrees simulates location changes. The inventors used eleven combined shape deformation scenarios that simulate both object deformation and location changes (Table 6). A few sample images showed that the contrast inserts simulating the tumor and surrounding tissue in the phantom were distinguishable on all CT and T1 and T2 MR images, as shown in FIG. 10.

TABLE 6

Eleven combined contour deformation scenarios that simulate both contour deformation and location changes. All large inserts were filled with Mobil DTE oil

| Phantom insert rotation | Measured Inserts Volume (cc) | |
|---|---|---|
| | Circle/Oval/Irregular | Agarose gel |
| Circle 0, agarose gel 0 (reference image) | 100.1 | 48.1 |
| Circle 90, agarose gel 45 | 100.5 | 48.1 |
| Circle 180, agarose gel 180 | 105.4 | 46.2 |
| Circle 270, agarose gel 225 | 98.1 | 47.3 |
| Oval 0, agarose gel 0 | 68.3 | 46.8 |
| Oval 90, agarose gel 0 | 68.9 | 47.4 |
| Oval 180, agarose gel 0 | 68.9 | 46.9 |
| Oval 270, agarose gel 0 | 68.1 | 47.4 |
| Irregular 0, agarose gel 0 | 58.3 | 48.3 |
| Irregular 90, agarose gel 0 | 58.8 | 48.1 |
| Irregular 180, agarose gel 0 | 58.5 | 47.2 |
| Irregular 270, agarose gel 0 | 58.7 | 46.8 |

Abbreviations

Circle, large insert with a circle shape; agarose gel, small insert with agarose gel; oval, large insert with an oval shape; irregular, large insert with an irregular shape.

Image Registration

The images were first registered using manual alignment by shifting and rotating the secondary image. Next, an ROI that encompassed the whole phantom was drawn. Within this ROI, the images were aligned first using Velocity rigid registration, which uses mutual information to align anatomy. MR Correctable Deformable was used to perform DIR. The MR correction applies a fade correction to the image to correct for shading artifacts that are typically caused by in-homogeneities in the magnetic field.

Contour Propagation

As illustrated in FIG. 11 (panels a, c, e), contours were delineated for large and small inserts using a predefined threshold for both CT and MRI prior to DIR. This provides a ground truth for contours of various shapes for quantitative validation. After DIR, all of the contours were propagated from reference images (T1, T2, and CT) to images obtained from other settings (secondary images). FIG. 11 (panels b, d, f) illustrates the overlay of the contours of various shapes after DIR.

DIR Accuracy

Quantitative comparisons of the contours can be performed using multiple metrics. Two commonly used approaches are the Dice similarity coefficient (DSC) (LR, 1945) and mean distance to agreement (MDA) (Chalana and Kim, 1997), which is also known as the mean distance to conformity. The DSC is defined as the ratio of twice the overlap of two structures (A and B) over the sum of their volumes and is widely used in DIR comparisons. DSC (A, B)=2(A∩B)/(A+B). The DSC ranges from 0 to 1, denoting the degree of a perfect match between two structures. Higher numbers indicate better agreement. MDA is a geometric parameter that measures the mean voxel shortest distance from the surface of one structure to another (ideal=0 mm).

Statistical Considerations

For comparison, all DSC and MDA data were compared between the MRI and CT scans in paired sample analyses; Wilcoxon matched-pair non-parametric tests (Cattaneo et al., 2008) were used to evaluate the differences between MRI and CT registration. A probability value of $p \leq 0.05$ was considered to be statistically significant; all statistical analyses were calculated using R statistical software (R Foundation for Statistical Computing, Vienna, Austria).

Results

There was no significant difference in DIR accuracy between T1 and T2 images ($p>0.05$). As illustrated in FIG. 12, the means and standard deviations (s.d.s) of DSC were 0.88±0.08 and 0.92±0.05 (T1 vs. T1) and 0.88±0.08 and 0.92±0.04 (T2 vs. T2) for fatty and prostate tissue (represented by Mobil DTE oil and agarose gel), respectively. As shown in FIG. 13, the means and s.d.s of MDA were 1.77 mm±1.1 mm and 1.1 mm±0.53 mm (T1 vs. T1) and 1.64 mm±0.8 mm and 0.96 mm±0.37 mm (T2 vs. T2). For the crossing image modality DIR, the means and s.d.s of DSC were 0.71±0.14 and 0.90±0.09 (T1 vs. CT) and 0.80±0.09 and 0.90±0.06 (T2 vs. CT), whereas the means and s.d.s of MDA were 4.57 mm±1.95 mm and 1.15 mm±0.92 mm (T1 vs. CT); 2.86 mm±1.08 mm and 1.16 mm±0.85 mm (T2 vs. CT), for fatty and prostate tissue, respectively. The DIR accuracy was lower for the crossing image modality than for the same modality, and the accuracy was also lower for the T1 sequence than for the T2 sequence ($p<0.001$), for both fatty and prostate tissue.

For crossing image modalities, the inventors compared the effect of ROI size by using large and small ROIs, as shown in FIG. 14. The small ROIs were drawn on Mobil DTE oil inserts simulating CTVs. The large ROI has a volume of 20 cm×20 cm×14 cm, and the small ROI has a volume of 8 cm×8 cm×7 cm. Using a small ROI improved the DIR accuracy for both T1 and T2 images: DSC large=0.71, DSC small=0.92 (T1, $p<0.0003$), MDA large=4.5 mm, and MDA small=1.5 mm (T1, $p<0.0003$) and DSC large=0.8, DSC small=0.96 (T2, $p<0.001$), MDA large=2.86 mm, and MDA small=0.61 mm (T2, $p<0.0001$).

Discussion

The inventors quantitatively evaluated the accuracy of DIR with a physical phantom and different MRI modalities. The tests included both intra-modality (T1 vs. T1 and T2 vs. T2) and inter-modality (T1 vs. CT and T2 vs. CT) validation. DIR was less accurate in crossing image modalities than within the same modality. With the exception of the T1 vs. CT crossing modality, all of the results were within the AAPM recommended levels (DSC>0.8 and MDA<3 mm). T2 images had superior DIR accuracy compared to T1 images on the crossing image modality. The inventors also found that a small ROI should be used to improve DIR accuracy for target contour propagation.

Most registration approaches that are currently in use can be classified as geometry based or intensity based. Geometry-based metrics use imaging features, such as anatomic or artificial landmarks and organ boundaries, while intensity-based metrics use image voxel data (Brock et al., 2017). Velocity software now uses an elastic B-spline algorithm and mattes mutual information as the cost-function metric (Pluim et al., 2003). Regardless of which algorithm is chosen, DIR has uncertainty. For areas with very low tissue contrast, registration can be prone to inaccuracies (Juang et al., 2013). Registration can be defined by nine criteria (Maintz and Viergever, 1998): dimensionality, nature of the registration basis, nature of the transformation, domain of transformation, interaction, optimization procedure, modalities involved, subject, and object. Therefore, the registration test using a physical phantom is essential to ensure the accuracy of the entire imaging workflow.

The use of image registration to improve the assessment of disease response is an active area of research (Eisenhauer et al., 2009). It should be mentioned that the magnitude of tumor changes (both location and shape) in real patients during the course of treatment can be substantial or minimal (Richard Y. Wu, 2017, Barker et al., 2004) with DIR accuracy varying accordingly. In our study, the phantom encompassed three shapes: circular, oval, and irregular. The design tested the general property, with limited scope of the DIR system. The accrual accuracy of DIR in real patients may vary.

Registration for treatment delivery and online treatment adaptation requires accurate DIR to ensure accurate treatment. Registration errors made at an individual fraction of treatment affect the delivery of that fraction only, while systematic errors, including operator error, affect the delivery of all treatment fractions (Brock et al., 2017). Tyran et al. (Tyran et al., 2018) evaluated the reliability of an MR-guided online adaptive radiation therapy decision-making process. The authors concluded that daily review was not a reliable method of determining whether adaptive radiation therapy is beneficial. They stated that an online predicted plan, based on deformed and manually adjusted contours, should be generated for every fraction. Therefore, adequate DIR accuracy for contours propagation is essential to ensure proper usage of online adaptive radiation therapy.

Recent advancements in synthetic CT using MRI data have made MRI-only treatment planning feasible for patients with brain tumors. However, the synthetic CT performance of MR-image-guided radiation therapy has not been well studied. The use of artificial intelligence has evolved in OARs segmentation and synthetic CT image generation. Fashandi et al. used a neural network method for breast MRI segmentation and found that it was accurate (Fashandi et al., 2019). Chen et al. investigated the feasibility of a deep convolutional neural network for MRI-based synthetic CT generation and evaluated its dosimetric accuracy in prostate intensity-modulated radiation therapy planning (Chen et al., 2018). This technology had higher HU accuracy than did the atlas-based method. The MRI DIR accuracy of synthetic CT needs to be validated with a standard physical phantom.

Buch et al. evaluated the influence of MRI scanning parameters on texture analysis features and found significant differences in many texture features with variations in MRI acquisition (Buch et al., 2018). In addition, the tumor texture and image intensities changed before and after treatment. Different types and locations of the tumor (i.e., the head and neck, brain, or lungs) may also affect DIR accuracy. DIR accuracy should be further evaluated as a function of tumor contrast in images acquired using different protocols and those materials covering a broader scope of tissue characteristic.

The MR-linac, which combines MRI with a linear accelerator, provides images of patient anatomy in real time; rigid and non-rigid deformations are also available before treatment via DIR. Consequently, there is a need for a full intensity-modulated radiation therapy optimization system that can adapt to the updated anatomic data during intrafraction delivery (Kontaxis et al., 2015). Because of its simple design, our phantom can be used to regularly validate DIR accuracy on the MR-linac.

Meheissen et al. assessed the quantitative signal intensity kinetics of the swallowing muscles as a potential biomarker of radiation-induced dysphagia in patients with oropharyngeal cancer (Mohamed A. M. Meheissen, 2019). Lincoln et al. evaluated a liver-specific contrast agent (gadoxetate disodium) for radiation therapy image guidance and concluded that it may provide useful image enhancement (Lincoln et al., 2019). Future studies should include DIR testing with contrast for both MRI vs MRI and MRI vs. CT.

The study also has limitations. The inventors used a standard head MRI T1 and T2 scanning protocol for the reference and secondary images. In addition, the inventors did not fully evaluate the registration results when the scanning protocol changed (i.e., proton density, diffusion-weighted images, or slice thickness changes).

Both 4D positron emission tomography (PET) and PET/MRI have gained popularity in target delineation and treatment outcome validation. In the future, the inventors will evaluate the possibility of filling solution mixed with F-18 or Tc-99m for PET/single-photon emission computer tomography (SPECT) to test DIR accuracy in PET and SPECT imaging.

Conclusion

The inventors quantitatively evaluated the accuracy of DIR for MRI. For the crossing image modality, T1 imaging performance was worse than T2 imaging performance. A smaller ROI should be used to improve the DIR accuracy for target contour propagation. The use of a phantom facilitated the AAPM's requirement that a physical phantom be used for end-to-end testing to account for all variations in the imaging chain.

All of the devices, apparatus, systems and/or methods disclosed and claimed herein can be made and executed without undue experimentation in light of the present disclosure. While the devices, apparatus, systems and methods of this invention have been described in terms of particular embodiments, it will be apparent to those of skill in the art that variations may be applied to the devices, apparatus, systems and/or methods in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

The contents of the following references are incorporated by reference herein:
1. Bender, E. T. and W. A. Tome, *The utilization of consistency metrics for error analysis in deformable image registration.* Phys Med Biol, 2009. 54(18): p. 5561-77.
2. Fallone, B. G., et al., *Assessment of a commercially available automatic deformable registration system.* J Appl Clin Med Phys, 2010. 11(3): p. 3175.
3. Kadoya, N., et al., *Evaluation of various deformable image registration algorithms for thoracic images.* J Radiat Res, 2014. 55(1): p. 175-82.
4. Kanai, T., et al., *Evaluation of accuracy of B-spline transformation-based deformable image registration with different parameter settings for thoracic images.* J Radiat Res, 2014. 55(6): p. 1163-70.
5. Kashani, R., et al., *Objective assessment of deformable image registration in radiotherapy: a multi-institution study.* Med Phys, 2008. 35(12): p. 5944-53.
6. Pukala, J., et al., *A virtual phantom library for the quantification of deformable image registration uncertainties in patients with cancers of the head and neck.* Med Phys, 2013. 40(11): p. 111703.

7. Stanley, N., et al., *Using patient-specific phantoms to evaluate deformable image registration algorithms for adaptive radiation therapy*. J Appl Clin Med Phys, 2013. 14(6): p. 4363.
8. Yu, Z. H., et al., *Learning anatomy changes from patient populations to create artificial CT images for voxel-level validation of deformable image registration*. J Appl Clin Med Phys, 2016. 17(1): p. 246-258.
9. Wognum, S., et al., *Validation of deformable image registration algorithms on CT images of ex vivo porcine bladders with fiducial markers*. Med Phys, 2014. 41(7): p. 071916.
10. Singhrao, K., N. Kirby, and J. Pouliot, *A three-dimensional head-and-neck phantom for validation of multimodality deformable image registration for adaptive radiotherapy*. Med Phys, 2014. 41(12): p. 121709.
11. Kirby, N., et al., *The need for application-based adaptation of deformable image registration*. Med Phys, 2013. 40(1): p. 011702.
12. Molineu, A., et al., *Design and implementation of an anthropomorphic quality assurance phantom for intensity-modulated radiation therapy for the Radiation Therapy Oncology Group*. Int J Radiat Oncol Biol Phys, 2005. 63(2): p. 577-83.
13. Followill, D. S., et al., *Design, development, and implementation of the radiological physics center's pelvis and thorax anthropomorphic quality assurance phantoms*. Med Phys, 2007. 34(6): p. 2070-6.
14. Mohamed, A. S., et al., *Quality assurance assessment of diagnostic and radiation therapy-simulation CT image registration for head and neck radiation therapy: anatomic region of interest-based comparison of rigid and deformable algorithms*. Radiology, 2015. 274(3): p. 752-63.
15. Brock, K. K., et al., *Use of image registration and fusion algorithms and techniques in radiotherapy: Report of the AAPM Radiation Therapy Committee Task Group No. 132*. Med Phys, 2017. 44(7): p. e43-e76.
16. Schreibmann, E., et al., *A measure to evaluate deformable registration fields in clinical settings*. J Appl Clin Med Phys, 2012. 13(5): p. 3829.
17. Bharatha, A., et al., *Evaluation of three-dimensional finite element-based deformable registration of pre- and intraoperative prostate imaging*. Med Phys, 2001. 28(12): p. 2551-60.
18. Liang, J. and D. Yan, *Reducing uncertainties in volumetric image based deformable organ registration*. Med Phys, 2003. 30(8): p. 2116-22.
19. Wu, X., et al., *Deformable image registration for the use of magnetic resonance spectroscopy in prostate treatment planning*. Int J Radiat Oncol Biol Phys, 2004. 58(5): p. 1577-83.
20. Yan, D., D. A. Jaffray, and J. W. Wong, *A model to accumulate fractionated dose in a deforming organ*. Int J Radiat Oncol Biol Phys, 1999. 44(3): p. 665-75.
21. Brock, K. K., et al., *Feasibility of a novel deformable image registration technique to facilitate classification, targeting, and monitoring of tumor and normal tissue*. Int J Radiat Oncol Biol Phys, 2006. 64(4): p. 1245-54.
22. Brock, K. K., *Results of a multi-institution deformable registration accuracy study (MIDRAS)*. Int J Radiat Oncol Biol Phys, 2010. 76(2): p. 583-96.
23. Reaungamornrat, S., et al., *Performance evaluation of MIND demons deformable registration of MR and CT images in spinal interventions*. Phys Med Biol, 2016. 61(23): p. 8276-8297.
24. Ger, R. B., et al., *Accuracy of Deformable Image Registration on Magnetic Resonance Images in Digital and Physical Phantoms*. Med Phys, 2017.
25. BARKER, J. L., JR., GARDEN, A. S., ANG, K. K., O'DANIEL, J. C., WANG, H., COURT, L. E., MORRISON, W. H., ROSENTHAL, D. I., CHAO, K. S., TUCKER, S. L., MOHAN, R. & DONG, L. 2004. Quantification of volumetric and geometric changes occurring during fractionated radiotherapy for head-and-neck cancer using an integrated CT/linear accelerator system. *Int J Radiat Oncol Biol Phys*, 59, 960-70.
26. BROCK, K. K., MUTIC, S., MCNUTT, T. R., LI, H. & KESSLER, M. L. 2017. Use of image registration and fusion algorithms and techniques in radiotherapy: Report of the AAPM Radiation Therapy Committee Task Group No. 132. *Med Phys*, 44, e43-e76.
27. BUCH, K., KUNO, H., QURESHI, M. M., LI, B. & SAKAI, O. 2018. Quantitative variations in texture analysis features dependent on MRI scanning parameters: A phantom model. *J Appl Clin Med Phys*, 19, 253-264.
28. CATTANEO, G. M., DELL'OCA, I., BROGGI, S., FIORINO, C., PERNA, L., PASETTI, M., SANGALLI, G., DI MUZIO, N., FAZIO, F. & CALANDRINO, R. 2008. Treatment planning comparison between conformal radiotherapy and helical tomotherapy in the case of locally advanced-stage NSCLC. *Radiother Oncol*, 88, 310-8.
29. CHALANA, V. & KIM, Y. 1997. A methodology for evaluation of boundary detection algorithms on medical images. *IEEE Trans Med Imaging*, 16, 642-52.
30. CHEN, S., QIN, A., ZHOU, D. & YAN, D. 2018. Technical Note: U-net-generated synthetic CT images for magnetic resonance imaging-only prostate intensity-modulated radiation therapy treatment planning. *Med Phys*, 45, 5659-5665.
31. CUNNINGHAM, J. M., BARBERI, E. A., MILLER, J., KIM, J. P. & GLIDE-HURST, C. K. 2018. Development and evaluation of a novel MR-compatible pelvic end-to-end phantom. *J Appl Clin Med Phys*.
32. DE BRABANDERE, M., KIRISITS, C., PEETERS, R., HAUSTERMANS, K. & VAN DEN HEUVEL, F. 2006. Accuracy of seed reconstruction in prostate postplanning studied with a CT- and MRI-compatible phantom. *Radiother Oncol*, 79, 190-7.
33. EISENHAUER, E. A., THERASSE, P., BOGAERTS, J., SCHWARTZ, L. H., SARGENT, D., FORD, R., DANCEY, J., ARBUCK, S., GWYTHER, S., MOONEY, M., RUBINSTEIN, L., SHANKAR, L., DODD, L., KAPLAN, R., LACOMBE, D. & VERWEIJ, J. 2009. New response evaluation criteria in solid tumours: revised RECIST guideline (version 1.1). *Eur J Cancer*, 45, 228-47.
34. FASHANDI, H., KULING, G., LU, Y., WU, H. & MARTEL, A. L. 2019. An investigation of the effect of fat suppression and dimensionality on the accuracy of breast MRI segmentation using U-nets. *Med Phys*.
35. GER, R. B., YANG, J., DING, Y., JACOBSEN, M. C., FULLER, C. D., HOWELL, R. M., LI, H., JASON STAFFORD, R., ZHOU, S. & COURT, L. E. 2017. Accuracy of deformable image registration on magnetic resonance images in digital and physical phantoms. *Med Phys*, 44, 5153-5161.
36. JUANG, T., DAS, S., ADAMOVICS, J., BENNING, R. & OLDHAM, M. 2013. On the need for comprehensive validation of deformable image registration, investigated with a novel 3-dimensional deformable dosimeter. *Int J Radiat Oncol Biol Phys*, 87, 414-21.

37. KADOYA, N., NAKAJIMA, Y., SAITO, M., MIYABE, Y., KUROOKA, M., KITO, S., FUJITA, Y., SASAKI, M., ARAI, K., TANI, K., YAGI, M., WAKITA, A., TOHYAMA, N. & JINGU, K. 2016. Multi-institutional Validation Study of Commercially Available Deformable Image Registration Software for Thoracic Images. *Int J Radiat Oncol Biol Phys,* 96, 422-431.

38. KONTAXIS, C., BOL, G. H., LAGENDIJK, J. J. & RAAYMAKERS, B. W. 2015. Towards adaptive IMRT sequencing for the MR-linac. *Phys Med Biol,* 60, 2493-509.

39. LINCOLN, J. D., PARSONS, D., CLARKE, S. E., CWAJNA, S. & ROBAR, J. L. 2019. Technical Note: Evaluation of kV CBCT enhancement using a liver-specific contrast agent for stereotactic body radiation therapy image guidance. *Med Phys.*

40. LR, D. 1945. Measures of the Amount of Ecologic Association Between

41. Species. *Ecology.* 1945; 26:297-302., 26, 297-302.

42. MAINTZ, J. B. & VIERGEVER, M. A. 1998. A survey of medical image registration. *Med Image Anal,* 2, 1-36.

43. MITCHELL, M. D., KUNDEL, H. L., AXEL, L. & JOSEPH, P. M. 1986. Agarose as a tissue equivalent phantom material for NMR imaging. *Magn Reson Imaging,* 4, 263-6.

44. MOHAMED A. M. MEHEISSEN, A. S. R. M. M. K., MIKE HERNANDEZ, STEFANIA VOLPE, HESHAM ELHALAWANI, MARTHA P. BARROW, YAO DING, JIHONG WANG, RAJ DAVULURI, YOUSRI ROSTOM, NEAMAT HEGAZY, G. BRANDON GUNN, STEPHEN Y. LAI, ADAM S. GARDEN, JAN S. LEWIN C, DAVID I. ROSENTHAL, STEVEN J. FRANK, CLIFTON D. FULLER, KATHERINE A. HUTCHESON 2019. A prospective longitudinal assessment of MRI signal intensity kinetics of non-target muscles in patients with advanced stage oropharyngeal cancer in relationship to radiotherapy dose and post-treatment radiation-associated dysphagia: Preliminary findings from a randomized trial. *Radiother Oncol,* 130, 46-55.

45. NIEBUHR, N. I., JOHNEN, W., ECHNER, G., RUNZ, A., BACH, M., STOLL, M., GISKE, K., GREILICH, S. & PFAFFENBERGER, A. 2019. The ADAM-pelvis phantom—an anthropomorphic, deformable and multimodal phantom for MRgRT. *Phys Med Biol.*

46. PALMER, E., PERSSON, E., AMBOLT, P., GUSTAFSSON, C., GUNNLAUGSSON, A. & OLSSON, L. E. 2018. Cone beam CT for QA of synthetic CT in MRI only for prostate patients. *J Appl Clin Med Phys,* 19, 44-52.

47. PLUIM, J. P., MAINTZ, J. B. & VIERGEVER, M. A. 2003. Mutual-information-based registration of medical images: a survey. *IEEE Trans Med Imaging,* 22, 986-1004.

48. RICHARD Y. WU, A. Y. L., TERENCE T. SIO, PIERRE BLANCHARD, CODY WAGES, MAYANKKUMAR V. AMIN, GARY B. GUNN, UWE TITT, RONG YE, KAZUMICHI SUZUKI, MICHAEL T. GILLIN, XIAORONG R. ZHU, RADHE MOHAN, AND STEVEN J. FRANK 2017. Intensity-Modulated Proton Therapy Adaptive Planning for Patients with Oropharyngeal Cancer. *International Journal of Particle Therapy,* 4, 26-34.

49. TAIT, L. M., HOFFMAN, D., BENEDICT, S., VALICENTI, R. & MAYADEV, J. S. 2016. The use of MRI deformable image registration for CT-based brachytherapy in locally advanced cervical cancer. *Brachytherapy,* 15, 333-40.

50. TYRAN, M., JIANG, N., CAO, M., RALDOW, A., LAMB, J. M., LOW, D., LUTERSTEIN, E., STEINBERG, M. L. & LEE, P. 2018. Retrospective evaluation of decision-making for pancreatic stereotactic MR-guided adaptive radiotherapy. *Radiother Oncol,* 129, 319-325.

51. WU, R. Y., LIU, A. Y., WISDOM, P., ZHU, X. R., FRANK, S. J., FULLER, C. D., GUNN, G. B., PALMER, M. B., WAGES, C. A., GILLIN, M. T. & YANG, J. 2019. Characterization of a new physical phantom for testing rigid and deformable image registration. *J Appl Clin Med Phys,* 20, 145-153.

The invention claimed is:

1. A device for testing the accuracy of deformable image registration systems, the device comprising:
    a base;
    a support member coupled to the base, wherein the support member is configured to rotate about a first axis with respect to the base;
    a housing coupled to the support member, wherein the housing is configured to rotate about a second axis with respect to the support member; and
    an insert coupled to the housing, wherein the insert is configured to rotate about a third axis with respect to the housing.

2. The device of claim 1 further comprising a first locking mechanism configured to lock the support member housing in a plurality of rotated positions with respect to the base.

3. The device of claim 2 further comprising a first plurality of indications to identify the plurality of rotated positions.

4. The device of claim 1 further comprising a second locking mechanism configured to lock the housing in a plurality of angled positions with respect to the support member.

5. The device of claim 4 further comprising a second plurality of indications to identify the plurality of angled positions.

6. The device of claim 1 wherein the insert comprises a cavity and a seal configured to seal the cavity.

7. The device of claim 6 wherein the cavity is filled with a liquid.

8. The device of claim 6 wherein the cavity is filled with a solid.

9. The device of claim 6 wherein the cavity has an oval cross-section shape.

10. The device of claim 6 wherein the cavity has a circular cross-section shape.

11. The device of claim 1 wherein the first axis is vertical and the second axis and third axis are horizontal.

12. The device of claim 1 wherein the insert is a first insert and wherein the device further comprises:
    a second insert coupled to the housing, wherein the second insert is configured to rotate about a fourth axis with respect to the housing.

13. The device of claim 12 wherein the fourth axis is a horizontal axis.

* * * * *